United States Patent [19]
Jones et al.

[11] 3,796,058
[45] *Mar. 12, 1974

[54] METHOD AND APPARATUS FOR WORKING WITH OFFSHORE PIPELINES

[75] Inventors: Jerry J. Jones; Joe C. Lochridge, both of Houston, Tex.

[73] Assignee: Brown & Root, Inc., Houston, Tex.

[ * ] Notice: The portion of the term of this patent subsequent to April 10, 1990, has been disclaimed.

[22] Filed: Mar. 9, 1973

[21] Appl. No.: 339,964

[52] U.S. Cl. .............. 61/72.3, 114/144, 235/150.27
[51] Int. Cl. .......................... F161 1/00, B63h 25/42
[58] Field of Search .................. 61/72.3, 72.1, 72.4; 235/150.27; 114/144, .5, 235, 195, 226

[56] References Cited
UNITED STATES PATENTS
3,668,878  6/1972  Jones et al. .......................... 61/72.3

3,280,311  10/1966  Shatto et al. ..................... 61/72.3 X
3,390,532  7/1968   Lawrence ......................... 61/72.3
3,546,888  12/1970  Kolb et al. ....................... 61/72.3
3,576,977  5/1971   Kolb ............................. 235/150.27

*Primary Examiner*—Jacob Shapiro
*Attorney, Agent, or Firm*—Burns, Doane, Swecker & Mathis

[57] ABSTRACT

A technique and apparatus for laying offshore pipelines wherein the manipulating of a pipeline is controlled in response to visually observed relationships between a preplotted pipeline route and the plotted actual position of a pipeline lay barge.

6 Claims, 16 Drawing Figures

PATENTED MAR 12 1974

METHOD AND APPARATUS FOR WORKING WITH OFFSHORE PIPELINES

RELATED CASES

This application is a continuation-in-part of copending Jones and Lockridge applications, Ser. No. 886,562, filed Dec. 19, 1969, now U.S. Pat. No. 3,725,919 entitled "Method and Apparatus for Plotting Vessel Positions," and assigned to the assignee of the present invention.

Moreover, this disclosure incorporates, for disclosure purposes, an improvement featured in a copending Reeves application, Ser. No. 123,227, filed Mar. 11, 1971, entitled "Electronic Range Measuring Method and Apparatus," and assigned to the assignee of the present invention.

BACKGROUND OF INVENTION

The present invention relates to a method and apparatus for determining and recording in real time the actual position of a vessel relative to a predetermined course.

DEMAND IN ART

With the spiraling growth and expansion of the petroleum industry, an increasing demand for highly accurate measurements and records, particularly in offshore exploration, surveying, construction, and pipelaying, has developed. These types of operations may involve the exploration or mapping of the ocean bottom at predetermined locations or over predetermined courses, the construction of towers and other structures at particular locations, or the precise laying of a pipeline along a predetermined route. In each case, a precise record of the actual course followed or the precise location of the construction or exploration site is of great importance.

For example, in pipelaying operations it may be necessary to follow a predetermined piepline route with extreme accuracy because of the severely limited extent of the right-of-way on either side of the route and because of the existence of obstructions on the ocean floor. Such problems may give rise to a requirement for very close tolerances in following a course which can vary erratically. In addition, an accurate record of the actual position of the pipeline on the ocean floor may be required for job certification where the contract calls for specific tolerances to be kept or for future reference in locating the piepline and its associated fittings for maintenance and/or repair.

PROBLEMS TO BE OVERCOME

At least two major problems may be encountered in determining and plotting the position of a vessel such as a pipelaying barge relative to a desired course with the accuracy required by present standards. The actual vessel position must be accurately determined and translated into a form conducive to both rapid and accurate plotting, preferably with little or no intervention by the operator. Additionally, the resultant chart must be plotted to a large enough scale to make the information plotted thereon meaningful as a record of pipeline position.

While the development of more accurate position determining systems has facilitated the determination of actual vessel position at sea, there may be inherent inaccuracies or limitations which seriously hamper their application where extreme accuracy is required. Acoustic systems, for example, are severely limited by the depth of the water in which they are being utilized and are quite limited in range. Radio navigation systems, while providing the requisite range capabilities for most of the above applications, are limited by variations in atmospheric conditions and inherent calibration inaccuracies. A further difficulty in the use of such systems on large offshore vessels is the perturbations resulting from antenna and vessel superstructure interaction.

Further, of the above types of position determining systems, the output signals, where provided, are not conducive to direct plotting, particularly where the plot must be adapted to immediately convey intelligible information to an operator or navigator. Thus, in order to meet the present demands for accuracy and speed, the position determining and plotting system should be capable of correcting errors due to system limitations and inaccuracies and should further be capable of translating the position information into an accurate plot relative to a desired course or position to provide both the required record and navigation information.

Where the desired course is perfectly straight from beginning to end, the problem of determining actual vessel position and translating this information into the required form with accuracy and speed still exists. The chart, however, may be easily plotted to a meaningful scale, since a relatively narrow, elongated chart having the desired course plotted as a straight line centrally disposed thereon may be utilized. Since under these ideal conditions the desired course never varies, there remains an equal distance on either side of the desired course on the chart in which the actual position may be plotted without straying off the chart.

However, where the desired course changes in direction, the distances on either side of the desired course plot on the chart eventually become greatly unequal, and the desired course line may itself run off the chart. This may, of course, be compensated for by reducing the plotting scale factors to prevent these undesirable results. However, a reduction in plotting scale factors may lead to a highly inaccurate record of the pipeline position. Thus, the chart may be highly ineffectual as a future reference in locating the underwater pipeline or the construction or exploration site.

Also encountered in the laying of the pipeline is the problem of the reproducibility of the actual course at a later date, for example, for purposes of maintenance and/or repair. Reproducibility of the actual course, i.e., the ability to navigate the same course followed earlier, is an extreme problem offshore. If, for example, buoys are laid out along a predetermined course and followed during the pipelaying operation, course variations due to the displacement of the buoys by wind and current may result regardless of the accuracy with which the buoys are followed. Such variations do not always show up on the plot of the pipeline route. Since the buoys are normally removed upon completion of the pipelaying operation, the resultant records may be only generally indicative of the position of the pipeline.

NEED FOR, AND ASPECTS OF, PRECISION

Accurate range measurements are essential in numerous pipeline working operations. For example, the offshore operations involving pipeline surveying, pipeline laying, locating of underwater pipelines and positioning of buoyant pipeline markers may involve the use of range measurements between a vessel, such as a lay barge or work vessel, and relatively fixed objects for determining the geographical position of the vessel by trigonometric techniques. If the positions of the relatively fixed objects are known and the respective range between these objects and the vessel can be calculated to a high degree of accuracy, the geographical location of the vessel may likewise be calculated to a high degree of accuracy.

Even if a highly accurate record of the position of the pipeline and its associated fittings is produced during the pipelaying operations, these records are of limited utility if the plotted position cannot be accurately located at a future date. Since inaccuracies may give rise to particularly difficult problems in locating the underwater pipeline or fittings, it can be seen that great amounts of time and money may be saved where extremely accurate range measurements are utilized during position-critical offshore operations.

This invention contemplates range measuring systems which have been developed in an attempt to provide the accuracy required for the above-described operations. These systems utilize time measurements, i.e., the time required for electromagnetic energy to travel the distance between the unknown and known geographical locations.

For example, in pulsed distance measuring systems a pulse of wave energy is transmitted from one location toward the other location and an echo or return pulse is detected by the equipment at the transmitting location. Range is then calculated by measuring the time interval between the transmission and the reception of the returned pulse, dividing by two to convert to a one-way range, and by then multiplying the measured time by the speed of the wave energy in air to convert time to distance. This measuring technique is similar to phase measuring techniques in which a signal is transmitted toward the distant location and is returned therefrom and the phase difference between the transmitted and received signal is determined for multiplication by the reciprocal of the frequency, i.e., the wave length of the transmitted signal to obtain the signal round-trip time and subsequently the distance traveled by the signal during this time interval.

The accuracy of the range calculated by these systems depends, to a certain extent, upon the accuracy of the measurement of the time it takes the signal to travel through the atmosphere between the two locations; signal delays caused by anything other than the finite travel time of the signal through the atmosphere cause errors in the distance measurement. Thus, signal delays introduced by the equipment utilized to send and receive the signal and to calculate the transmission time may introduce certain errors in the range measurement.

Equipment introduced signal delays should therefore be subtracted from the total transmission time interval prior to using this time interval to calculate range. However, these equipment introduced signal delays include both relatively fixed delays and delays which may vary unpredictably. In the intermediate frequency stages of the receivers, for example, erratic variations in signal delay may occur due to changes in temperature, aging of components and variations in signal level.

To somewhat reduce these unpredictable variations, temperature control systems and precision components may be utilized, thereby permitting the varying delays to be more accurately treated as fixed delays. However, frequent calibration of the equipment may be needed to retain the equipment accuracy.

OBJECTS OF INVENTION

In the context of offshore pipeline working operations, this invention entails the following objectives.

It is a major object of the present invention to provide a novel method and system for accurately and rapidly determining and plotting an indication of a position of an offshore pipeline.

It is another object of the present invention to provide a novel method and system for accurately and rapidly determining and plotting the actual course of a pipelaying barge relative to a desired pipeline route.

It is yet another object of the present invention to provide a novel method and system for correcting and translating vessel position information into an accurate and usable plot of actual position.

It is a further object of the present invention to provide a novel method and system for plotting the actual course of a vessel relative to a desired course on a relatively narrow, elongated chart, without having the desired course stray from the confines of the chart, irrespective of the plotting scale factors utilized.

It is yet a further object of the present invention to provide a novel method and system for providing a reproducible record of the location of an underwater pipeline.

It is still a further object of the present invention to provide a novel method and apparatus for navigating a pipeline working vessel with precision relative to a predetermined course.

In light of the foregoing objects, it is an object to present certain invention in the context of improvements of others:

to obviate certain accuracy problems of range measuring systems;

to provide a method and apparatus for dynamically correcting for equipment introduced signal delays in time measurements used to calculate distance;

to provide a method and apparatus for dynamically eliminating range errors from range calculations and location calculations based therein which are due to unpredictably varying, equipment introduced signal delays;

to provide a method and apparatus for determining the distance between two locations by generating frequency shift keyed time reference marks and measuring the time interval between the transmission and reception of the time reference marks;

to provide a method and apparatus for determining the distance between two locations by generating a signal related in frequency to the transmission time of a signal between the two locations including the transmission time of the signal through equipment at the two locations, and signals related in frequency to the transmission time of a signal through the equipment at the two locations whereby the distance between the two locations can be calculated as a function of the two signals; and to provide a method and apparatus for more accurately conducting and providing records for offshore operations.

GENERAL SUMMARY OF INVENTION

In accomplishing, at least in part, certain of the foregoing objectives, this invention contemplates certain method and apparatus aspects of offshore, pipeline working operations.

The method aspect involves the provision of pipeline working vessel means which is operable to work with an at least partially submerged pipeline at an offshore location. Electrical signals are generated which are representative of the ranges from the pipeline working vessel means to each of a plurality of predetermined geographical positions. A position plotting means, carried by the pipeline working vessel means, contains a preplotted course related to a predetermined position of the pipeline. On the pipeline working vessel means, an actual offshore position of the pipeline working vessel means is determined during the performing of work relating to the pipeline.

On the plotting means carried by the pipeline working vessel means, an indication of a predetermined position of the pipeline relative to an actual position of the pipeline working vessel means is visually displayed.

Work is performed on the pipeline from the pipeline working vessel means, with the pipeline working vessel means floating on a body of water and with at least a portion of the pipeline being disposed on a submerged location spaced from the pipeline working vessel means. While performing such work on the pipeline from the pipeline working vessel means, the pipeline working vessel means is operated in accordance with the visual indication of the predetermined position of the pipeline relative to the pipeline working vessel means so as to cause the actual location of the pipeline working vessel means to tend to bear a desired coincidence with the predetermined pipeline position.

Apparatus aspects of the invention involve novel combinations of means operable to implement the foregoing method aspects.

DRAWINGS

In describing the invention, by way of example, reference will be made to certain preferred embodiments which are illustrated in appended drawings.

GENERAL SYSTEM CONTEXT

Figure 1:
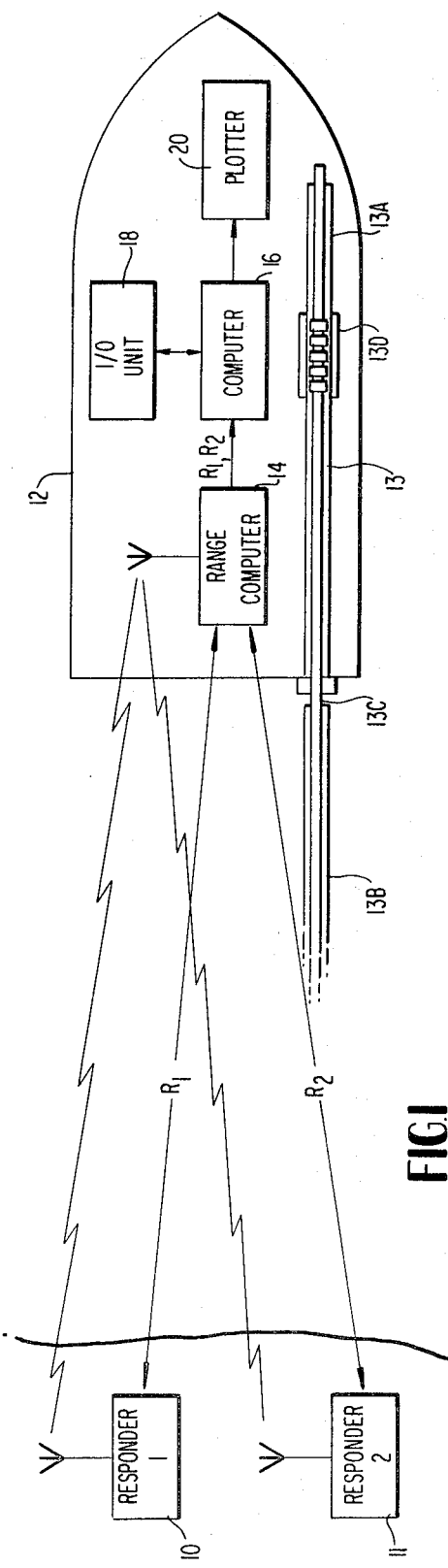
FIG. 1 is a functional block diagram of the overall system of the present invention.

Referring to FIG. 1, where a functional block diagram of a vessel position plotting system with which the present invention may be utilized is shown, a pair of transponders or responders 10 and 11 are provided at predetermined geographical locations. Here responders 10 are preferably on shore and are preferably at elevated positions relative to sea level.

A vessel 12 is provided with a range computer or interrogator unit 14 which calculates the ranges $R_1$ and $R_2$ respectively to the responders 10 and 11 and which supplies this range information to a general purpose digital computer 16 in a suitable form, e.g., binary coded decimal. The computer 16 is also provided, by way of a conventional input/output unit 18, with information such as the coordinate positions of the responders 10 and 11, the refractivity of the atmosphere, various plotter constants, and information as to the particular coordinate system utilized. The computer 16 is programmed to utilize this information to supply plotter command signals to a plotter 20, preferably of the incremental digital plotter type.

A desired vessel course or route is preplotted on a chart carried by the plotter 20. The computer 16, utilizing the range and other supplied information, provides a real time indication of actual vessel position in the form of the plotter command signals and thereby effects the plotting of present vessel position on the chart. In this manner a record of the actual route followed by the vessel relative to the preplotted desired route may be generated.

If, for example, this record is generated aboard a barge while laying elongate, flexible means such as a pipeline or cable on an ocean floor, the record indicates the relationship between a desired pipeline route and the actual route which the pipeline follows. This record thus provides extremely accurate data for job certification and for future maintenance and repair.

In addition, during the real time plotting of actual vessel position relative to the desired route, an extremely accurate comparison may be made between actual and desired vessel position at any time. The vessel may therefore be positioned in accordance with this comparison to more closely follow the desired route.

The system may be used, for example, in the laying of pipeline with pipeline laying equipment of the type described in Lawrence U.S. Pat. Nos. 3,390,532 and 3,472,034 and in Jones et al. U.S. Pat. No. 3,668,378. The preplot concept of the invention constitutes an alternative to the more automated, dynamic positioning approach featured in this Jones et al patent, with the preplot concept possessing its own unique advantages.

For example, as is disclosed in the Lawrence U.S. Pat. No. 3,390,532, the vessel 12 may be provided with a fixed ramp 13A upon which pipe is supported for joining sections threrof by welding. A buoyant ramp or stinger 13B may be pivotally connected at the after end 13C of the barge 12 to the fixed ramp 13A. A tensioning device 13D may be provided along the ramp 13A between the pipe joining station and the pivoted buoyant ramp or stinger 13B.

Figure 2:
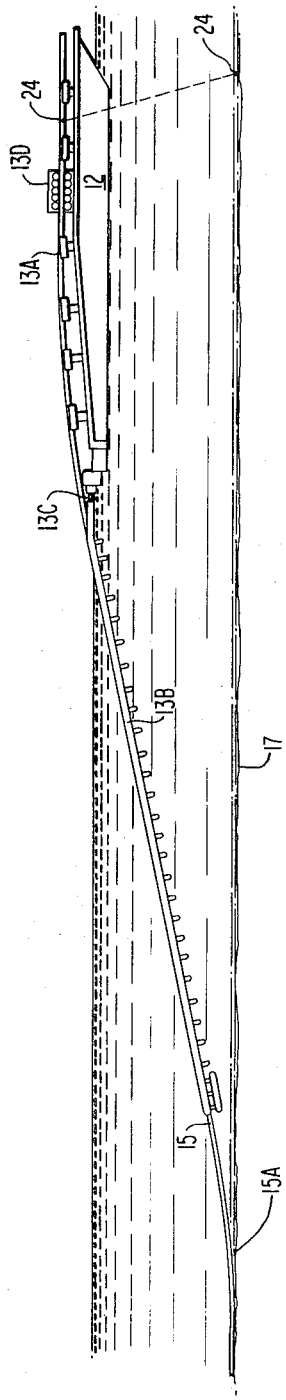
FIG. 2 is a view in elevation of a pipelaying barge laying pipeline on a sea bed.

Sections of pipe are joined together while supported by the fixed ramp 13A and slide rearwardly along the fixed and pivoted ramps into the water, as is illustrated in FIG. 2. The tensioning device 13D applies a selectively controlled and/or predetermined, continuous (but not necessarily constant) tension to the intermediate portion 15 of the pipeline suspended between the barge and the bottom 17 of the body of water. In this manner, the pipeline may be deposited on the sea bed 17 from a moving barge in water of all depths.

The objective of the invention as applied to pipelaying is to know exactly where the pipeline is being laid both for immediate use in positioning the vessel so that the actual pipeline route coincides with a desired pipeline route and also for future use in relocating the pipeline and its associated fittings.

With continued reference to FIG. 2, it can be seen that the barge 12 is generally positioned ahead of the point of contact 15A between the sea bed and the pipeline. The intermediate section 15 of the pipeline is curved primarily as a function of pipeline strength properties, the tension applied thereto and the depth of the water. Thus, a point 24 on a portion of the pipeline on the barge 12, when deposited on the sea bed, may assume a position ahead of its position on the barge as is illustrated in phantom or may assume a position identical to or behind its position on the barge if the sea bed below the barge slopes greatly enough. This displacement, if any, depends upon the curvature of the intermediate section 15 and the slope of the sea bed and is thus a function of the above enumerated factors.

Figure 3:
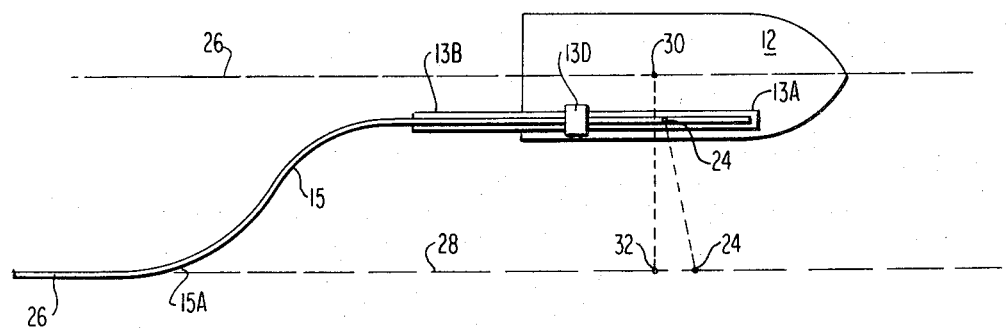
FIG. 3 is a plan view of the pipelaying barge of FIG. 2.
Figure 4:
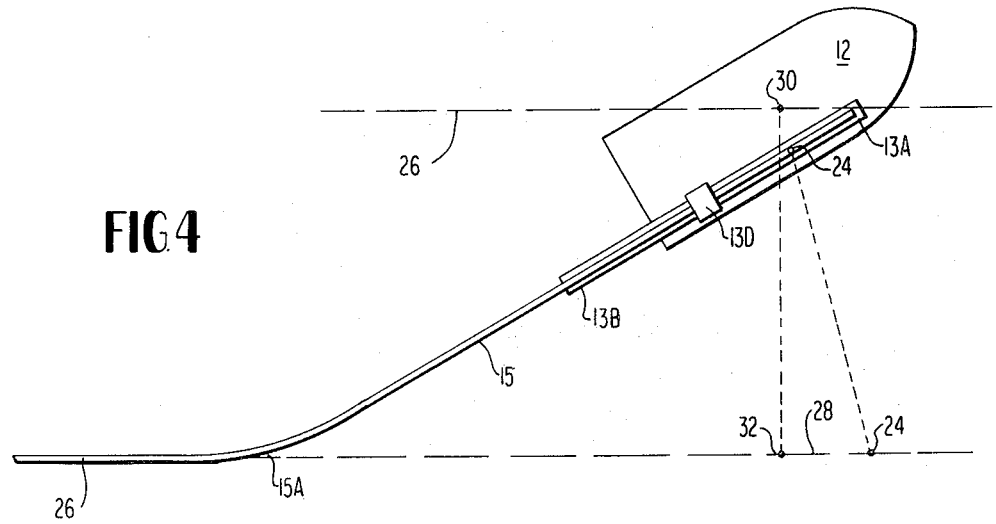
FIG. 4 is a plan view of the pipelaying barge of FIG. 2 utilizing a "crabbing" technique for laying pipeline.

Moreover, as is illustrated in the plan views of FIGS. 3 and 4, ocean currents and barge heading may further complicate the curvature of the intermediate section 15 of the pipeline. In FIG. 3, for example, barge heading and barge route 26 are substantially parallel to the pipeline route 28, but the pipeline route 28 is displaced to one side of the barge route 26 due to lateral currents. As is illustrated in FIG. 4, where a "crabbing" technique is shown, barge heading may necessarily be at an angle to barge route 26 and the pipeline route 28 due to the action of the lateral currents on the barge. While the barge route 26 and the pipeline route 28 of FIG. 4 may be substantially parallel, as in FIG. 3, the curvature of the intermediate section 15 of the pipeline is different and the lateral displacement of the pipeline route 28 to one side of the barge route 26 may also be different. Thus, the complex lateral and downward curvature of the intermediate section of the pipeline may also be a function of barge heading and ocean currents, resulting in a further longitudinal displacement of the point 24 of the pipeline (FIG. 2) as well as a lateral displacement between the pipeline route 28 along the sea bed and the barge route 26.

If an accurate record of pipeline route is desired, these various factors should be taken into account. The ranging system of the present invention provides ranges from a position 30 on the barge to the two known geographical locations at which the responders 10 and 11 are located. The position calculated from this information is actual barge position which, as was discussed above, may differ both from the position of the pipeline already in contact with the sea bed and from the future position 32 of the pipeline then on the barge once it is deposited on the sea bed.

Figure 5:
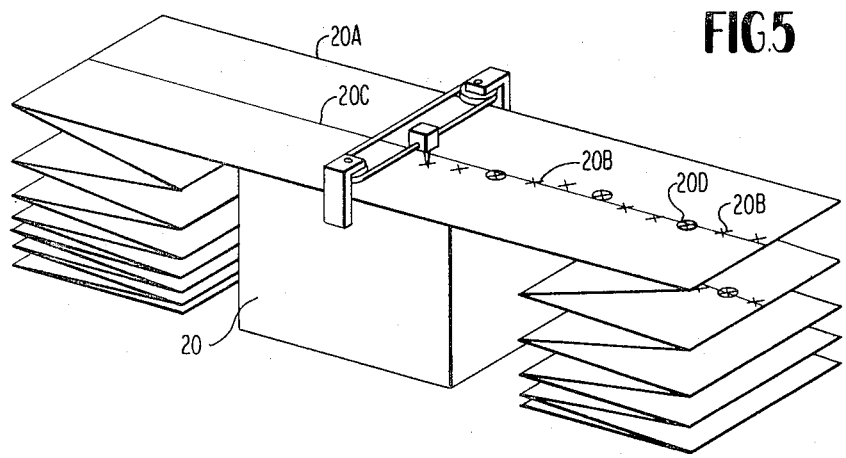
FIG. 5 is a perspective view of the plotter of FIG. 1, with a fan-folded chart thereon.

In any event, the actual route 28 of the pipeline along the sea bed is a function of the route followed by the barge. The pipeline route may therefore be determined from the position of the barge at predetermined intervals. Referring to FIG. 5, a record 20A of actual pipeline route 20B relative to a desired pipeline route 20C, together with an indication of valve or fitting positions 20D, may be desired for immediate reference in positioning the barge 12 and for future reference in locating the pipeline and its fittings. This record may be particularly important in view of the present emphasis on pollution control resulting in a need to be able to rapidly locate troublesome sections of the pipeline.

As was previously discussed, the barge route 26 may or may not coincide with the pipeline route 28. If these routes coincide, i.e., if no lateral currents exist, an accurate record of pipeline route 20B may be obtained by plotting computed barge position on the chart 20A relative to a preplotted desired pipeline route 20C. A slight correction may be introduced by the computer 16 (FIG. 1) to eliminate the longitudinal displacement error discussed in connection with FIG. 2 and to thereby provide a more accurate record of valve position 20D. These corrections may be introduced by monitoring the conditions which cause the longitudinal displacement error and by calculating the error using conventional mathematical techniques either as the pipeline is being laid or at a later time. Alternatively, the corrections may be calculated prior to the pipelaying operation from survey or other information and introduced at the appropriate times during the pipelaying operation.

If lateral currents and therefore the relationship discussed in connection with FIGS. 3 and 4 exist, the computer 16 may introduce corrections for lateral displacement of the pipeline route 28 relative to the barge route 26 to thereby provide a record of actual pipeline route relative to a preplotted desired pipeline route. Alternatively, a desired vessel route may be preplotted, taking into account the lateral displacement and the actual vessel route computed and plotted relative thereto during the pipelaying operation.

All such arrangements as above described contemplate the preplotting of a function of desired pipeline position (or pipeline working vessel) relative to the plotting of a function of actual pipeline position (or pipeline working vessel). Converting the record into a record of actual pipeline position may be easily accomplished at a later time if the displacement factors are known. Alternatively, the lateral displacement errors may be calculated by conventional mathematical techniques prior to commencing the pipelaying operation and applied to the calculations of actual barge position prior to plotting to thereby directly plot the actual pipeline route relative to a desired pipeline route.

In the above examples, the information plotted on the chart 20A of FIG. 5 is all predictive of future laid pipeline position information since the pipeline does not touch down on the sea bed until some time after the barge passes over a particular point. Another way of plotting pipeline route would be to correct all the information back to the point 15A at which contact is made between the sea bed 17 and the intermediate section 15 of the pipeline. Any of the above manners of obtaining the desired records may satisfactorily provide the desired accuracy and information.

In the range determining portion of the above described system it is, of course, necessary to interrogate both responder units to determine both ranges $R_1$ and $R_2$. To permit the interrogator unit 14 to independently interrogate the responders at predetermined intervals, a number of alternatives are available. For example, the interrogator unit 14 may periodically transmit a single interrogator signal which triggers both of the responder units 10 and 11. The responder units may then transmit signals at different frequencies which are separated sufficiently to allow the two responder signals to be separated for application to two receivers in the interrogator unit 14 for subsequent range measurement.

Alternatively, the responder units may be initially placed in a standby condition until predetermined codes assigned to each responder are received. A first code may be transmitted to place one of the responders in an operable condition and the range to this responder determined. This responder may then automatically, or on command, revert to the standby condition prior to the transmission of a second code which enables the other responder for subsequent range determination.

The selection of a particular method of obtaining independent range measurements to the two responders may depend on the width of the assigned frequency band and on the nature of the signals employed in determining range. For example, it may not be possible to utilize signals sufficiently separated in frequency due to the limited width of the assigned band. Or, it may not be possible to have both responders transmitting simultaneously (unless two interrogators are provided) where signal frequency itself provides the range information. Thus, the method utilized to obtain independent range measurements must be selected accordingly.

DESCRIPTION OF RANGING AND PLOTTING SYSTEM

Figure 6:
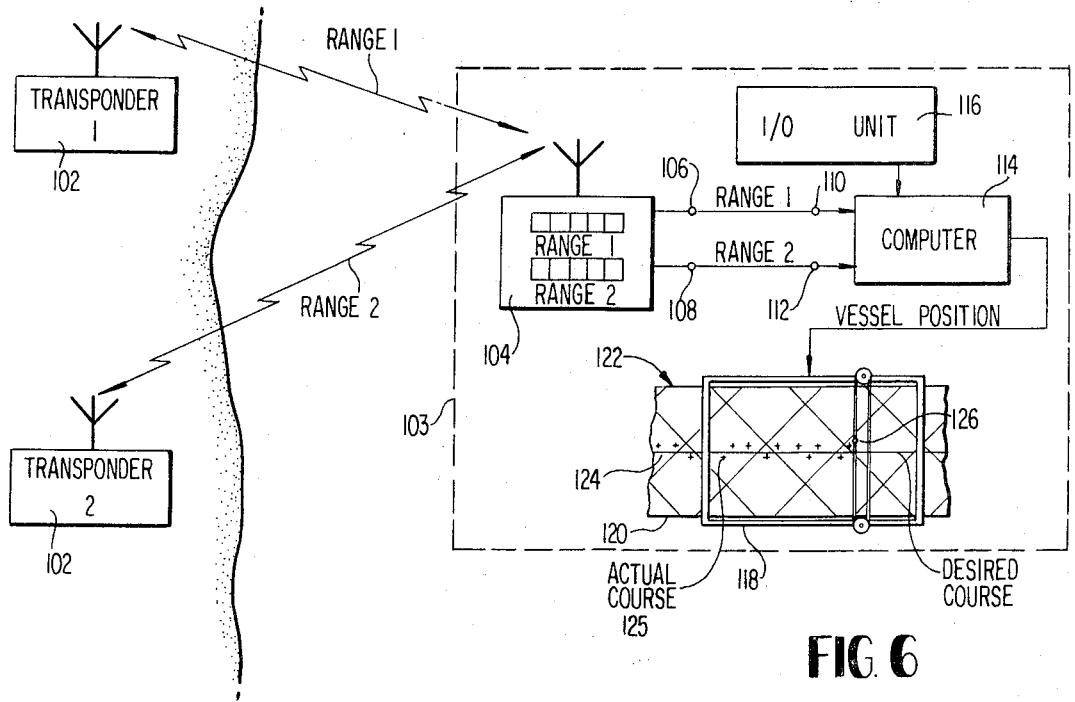
FIG. 6 is a functional block diagram of the ranging and plotting system of the present invention.

Referring to FIG. 6, the position plotting system of the present invention is illustrated in a functional block diagram. A plurality of transponders 102 (corresponding to 10 and 11) may be provided at predetermined geographical locations, preferably on shore and preferably at elevated positions relative to sea level. The pipeline working vessel 103 (corresponding to 12) may be provided with an interrogator unit 104 (corresponding to 14), a computer 114 (corresponding to 16) and a plotter 118 (corresponding to 20).

The interrogator unit 114 transmits a signal at predetermined intervals, e.g., 1 second intervals, to selectively trigger each of the transponders 102 on shore. Upon receipt of the transmitted interrogator signal, the transponders 102 are triggered and transmit a high frequency signal, preferably in the microwave range, e.g., 3,000 megahertz, which is received by a receiver in the interrogator unit 104.

The interrogator unit 104 determines the ranges from the vessel 103 to each of the transponders 102 by measuring the time lapse between the initiation of the interrogator signals and the receipt of the transponder signals, for example, by conventional pulse counting or phase comparison techniques. The ranges thus calculated may be displayed at the interrogator unit 104 and may additionally be provided at output terminals 106 and 108 in a coded form convenient for use in a computer, e.g., binary coded decimal.

The range values provided at the output terminals 106 and 108 of the interrogator unit 104 may be applied to the input terminals 110 and 112, respectively, of a computer 114. The computer 114 may be a general purpose digital computer and, for example, may be supplied by way of a conventional input/output unit 116 (corresponding to 18) with data as to the desired course coordinates, atmospheric refractivity values, transponder coordinates, transponder height information, barge antenna height information, the calibration factors of the range measurement system, and various scaling factors and plotter information. The range values and the supplied data may then be utilized to compute and plot vessel position in real time as will subsequently be described.

The computer 114 may be programmed to utilize the antenna and transponder height information, the refractivity information, the transponder latitude information and the microwave range measurement calibration constants to calculate range values corrected to the plane of a predetermined navigational coordinate system, for example, the horizontal plane when using the Lambert Conical Orthomorphic Projection system. Since the navigational coordinates of each of the transponders 102 are known, the computer 114 may, by conventional triangulation techniques using the corrected range values, calculate the position of the vessel 103 at any time relative to the predetermined navigational coordinate system.

Having determined the position of the vessel, the computer 114 may be programmed to utilize the course data or grid line orientation data, the scale factor information, and the plotter step information in conjunction with the computed vessel position to generate control signals to position the chart 120 and the pen or marker 126 of an incremental digital plotter 118.

In a particular example wherein the vessel is a pipelaying barge, the plotter 118 may be provided with a web or elongated chart 120 (corresponding to 20A) having computer plotted navigational grid lines 122 of the predetermined navigational coordinate system, and a desired course line 124 (corresponding to 20C) representing a desired pipeline route preplotted thereon. As previously described, the plotter control signals generated by the computer 114 are applied to the plotter 118 to incrementally position the chart 120 and the marker or pen 126. The actual barge position 125 (corresponding to 20B) relative to the preplotted grid system 122 may thereby be plotted providing an accurate record of the barge position and, thus, the position of the pipeline relative to the desired pipeline route.

Additionally, any error between the coordinates of the actual barge position and the desired course may be determined by the computer 114 and utilized to develop course correction signals. Alternatively, the operator may observe the error on the chart and manually correct the barge heading.

MICROWAVE RANGE MEASUREMENT SYSTEM

Figure 7:
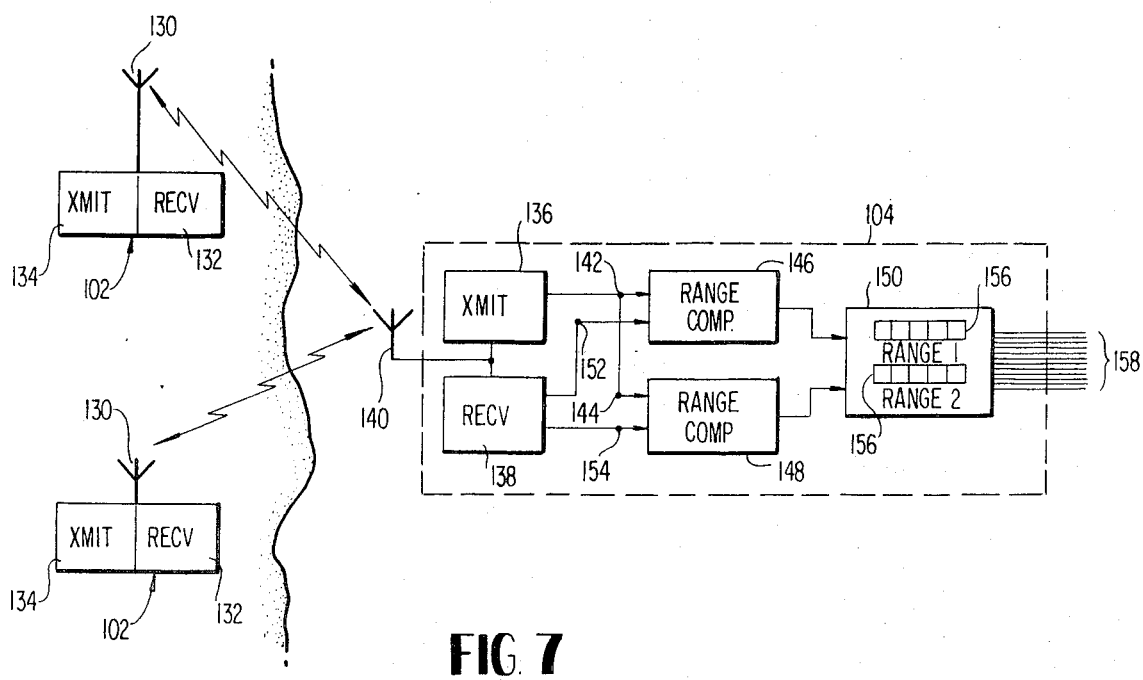
FIG. 7 is a functional block diagram of the range measurement portion of the system illustrated in FIG. 6.

Referring now to FIG. 7, the microwave range measurement system utilized in the barge position plotting system of the present invention may comprise a conventional Cubic "Autotape" model DM 40 manufactured by the Cubic Corporation, including a plurality of transponders 102 and an interrogator unit 104. Of course, the improved range measuring system hereinafter may be employed within the scope of this invention.

The transponders 102 may each be provided with an antenna 130 coupled to both a receiver 132 and a transmitter 134, which are interconnected to provide for the keying of the transmitter 134 in response to a signal of a predetermined frequency at the receiver 132.

The interrogator unit 104 may likewise be provided with a transmitter 136 and a receiver 138, both of which may be coupled to an antenna 140. The transmitter 136 may also be connected to the input terminals 142 and 144 of range computers 146 and 148, respectively, the output signals of which may be applied to a readout unit 150. In addition, the output signals from the receiver 138 may be applied to the input terminals 152 and 154 of the range computers 146 and 148, respectively.

Computers 146, 148 and 116, along with any other computer of the system, may be considered a common computer means of the overall invention.

In operation, the transmitter located in the interrogator unit 104 on the vessel 103 is keyed and a high frequency signal, e.g., 3,000 megahertz, is transmitted to the transponders 102. At the same time, the keying pulse is applied to the range computers 146 and 148. The transmitted signal is received by the receivers 132 of the transponders 102, thereby keying each of the transmitters which transmit a microwave signal, each modulated in a different manner. The signals from the transmitters 134 are received by the receiver 138 of the interrogator unit 104 and these signals, being modulated in a different manner, may be separated and directed to a particular range computer associated with a particular transponder 102.

Upon receipt of the signals from the receivers 138, the range computers 146 and 148 may determine, by conventional phase comparison techniques, the time interval from the initiation of the transmitted signal at the transmitter 136 to the receipt of a particular transmitted signal from the transponders 102. These time intervals may be divided by an appropriate constant related to the propagation velocity of microwave energy in the atmosphere to provide uncorrected slant ranges from the interrogator unit 104 to each of the transponders 102.

The uncorrected slant ranges may then be displayed visually at the visual indicator 156 of the readout unit 150, and may additionally be provided as coded output signals, e.g., binary coded decimal, at appropriate output termiansl 158.

THE COMPUTER

The computer 114 may be any suitable conventional general purpose digital computer programmed in a conventional manner to perform the desired real time functions. For example, the Hewlett Packard Model No. 2115A has been utilized with satisfactory results.

The functions performed by the computer desirably include the correction of transponder ranges, the computation of actual barge position in a predetermined navigational coordinate system from the corrected ranges, and the computation and generation of plotter command signals. Additionally, it may be desirable to read several range values at each predetermined interval and perform conventional ambiguity checks and averaging or smoothing techniques to provide for greater reliability and accuracy of range data. To facilitate an understanding of these functions as illustrated in FIG. 8, common nomenclature will be hereinafter used to designate both the computer signals and the physical quantities which the signals represent.

Figure 8:
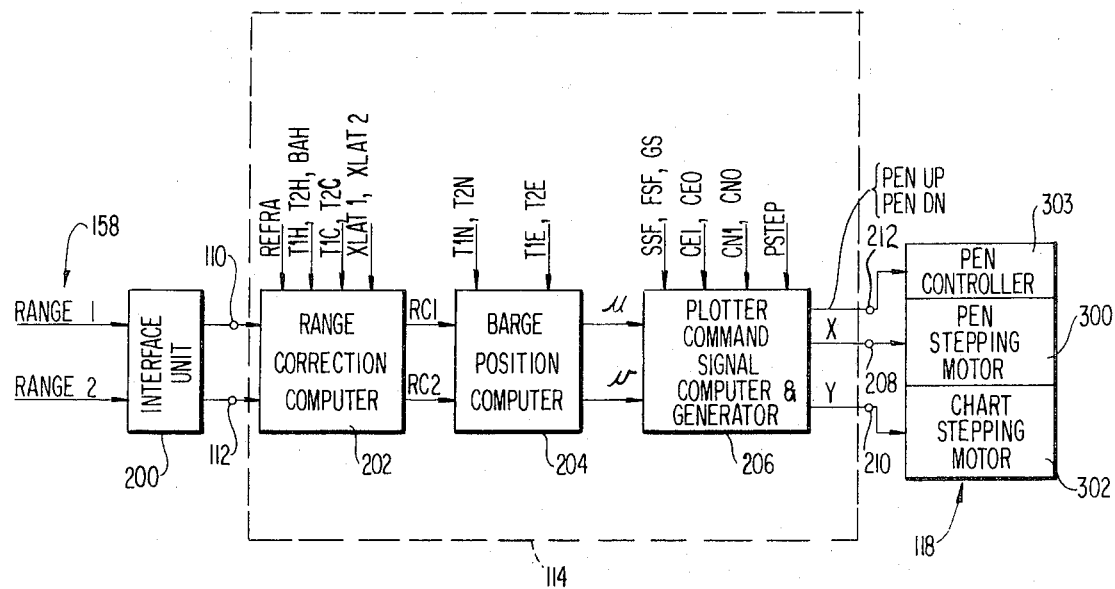
FIG. 8 is a functional block diagram of the computing portion of the system illustrated in FIG. 6.

Referring now to FIG. 8, the ranges $R_1$ and $R_2$ from the barge to the transponders may be applied as signal means 158, by way of a conventional interface unit 200, to the input terminals 110 and 112 of the computer 114. The interface unit 200 may be required to provide compatibility of the logic signal levels of the interrogator unit 104 to the logic signal level requirements of the computer 114.

For example, when using the Hewlett Packard Model No. 2115A computer and the Cubic "Autotape" microwave range measurement system Model DM 40, it is necessary to change the positive 6-volt logic output signals from the range measurement system to a negative 4-volt logic level signal required by the computer. Such interface units are entirely conventional, are well known in the art and may, for example, comprise a diode matrix or transistor inverter circuits connected to the proper bias voltage levels.

The computer program and other relevant data may be supplied to the computer 114 by way of a conventional input/output unit 116 (not shown in FIG. 8), for example, a Hewlett Packard Teleprinter, Model HP2752A. The teleprinter is especially suitable since the program and data may be read into the computer 114 from a punched tape and stored in computer memory or alternatively may be read into memory as required by the computer 114 to perform particular operations. This may considerably reduce the computer memory space required during a particular operation, e.g., during the plotting of actual vessel or lay barge position relative to a particular course or pipeline route segment, since only that data related to the particular operation need be stored in memory.

In addition, the computer 114 may be programmed to command the printing of range or other data for specific points along the actual course. For example, in laying pipeline, it may be advantageous to record the ranges to each of the transponders whenever a valve or fitting is installed in the line.

This range information is, of course, available from the coordinates of the position plotted on the chart and the known coordinates of the trans-ponders which may not appear on the chart. However, the reading of the coordinates from the chart may involve interpolation and therefore may not provide the extreme accuracy required to precisely locate a particular fitting. With a directly readable record of the ranges to each of the transponders from a particular fitting, a repair or maintenance vessel equipped with range measurement equipment may locate the fitting with precision.

The first function performed by the computer may be that of correcting the ranges $R_1$ and $R_2$ for errors due to the refractivity of the atmosphere. Adjustments may also be made for the calibration factors of the microwave ranging system. Since the ranges $R_1$ and $R_2$ are, in fact, slant ranges, it may also be desirable to correct the ranges $R_1$ and $R_2$ to a single horizontal reference plane, or the reference plane, curved or flat, of any desired coordinate system.

To facilitate an understanding of the overall computer operation, the means for performing the various computer functions have been separated but may be in fact performed by a single means. The range correction computer 202 may be provided with signal data representative of the uncorrected ranges $R_1$ and $R_2$, the refractivity of the atmosphere REFRA, the transponder calibration factors T1C and T2C, the height of the transponders above sea level T1H and T2H, the height of the barge antenna BAH, and the latitudes of the two transponders XLAT1 and XLAT2.

The ranges $R_1$ and $R_2$ may then be corrected for greater accuracy by applying the calibration factor REFRA to both ranges $R_1$ and $R_2$ to correct for errors due to the possible variations of the refractivity of the atmosphere from a predetermined standard value. The calibration factors T1C and T2C may be used, respectively, to correct the ranges $R_1$ and $R_2$ for any errors introduced by the respective transponders. In addition, since the ranges required by the computer 114 to compute the barge position must be measured within the reference plane of the selected navigational coordinate system, a further correction utilizing the signals T1H, T2H and BAH may be made for differences between the transponder and barge antenna height. The signals XLAT1 and XLAT2 may be used to correct for any transponder height errors caused by the curvature of the earth.

Each of the above corrections may be made in a manner well known in the navigation and range measurement art and may be accomplished by conventional computer programming techniques on the computer 114.

The corrected range signals RC1 and RC2 from the range correction computer 202 may then be utilized by the computer 114 in determining the coordinates of actual barge position. This function may be performed by the computer 114 in a functional section represented as the barge position computer 204. The barge position computer 204, in addition to the corrected ranges RC1 and RC2, is provided with the Northing coordinates T1N and T2N and the Easting coordinates T1E and T2E of the transponders. This data may then be utilized to determine the coordinates of the barge position with respect to the predetermined navigational coordinate system by conventional triangulation techniques.

The actual barge position coordinates u and v from the barge position computer 204 may then be utilized to compute and generate plotter command signals for driving the marker or pen 126 and the chart 120 of the incremental digital plotter 118 illustrated in FIG. 6. This latter function may be performed within the computer 114 by a plotter command signal computer and generator 206 to which may be applied, in addition to the barge position coordinates $u$ and $v$, the side scale factor SSF, the forward scale Factor FSF, the plot step PSTEP, the grid spacing GS of the chart, the Easting coordinates CEI and CEO of the beginning and end points of a respectively predetermined section or leg of the desired course, and the Northing coordinates CN1 and CNO respectively of the beginning and end points of the same desired course leg.

The computation may be accomplished in a variety of ways, depending on the manner in which the chart is prepared. The chart may, for example, be provided with grid lines of the predetermined navigational coordinates system plotted thereon with the particular angular orientation relative to a reference line on the chart, e.g., the center line or one edge of the chart. The desired course, i.e., the predetermined pipeline route, may then be plotted relative to the grid lines, thereby providing a graphic display of the desired course as it would appear on any chart.

When the grid lines are plotted in this manner, the computer need only be provided with data as to the coordinates of the beginning of the desired course and the angular orientation of the grid lines on the chart relative to the X and Y axes of the plotter, i.e., the axis perpendicular to the longitudinal axis of the plotter and the axis parallel to the longitudinal axis of the plotter, respectively. Given this information and the computed coordinates u and v of the actual barge position, the computer may determine the distances and directions relative to the X and Y axes of the plotter from the coordinates of the beginning of the desired course, or from any other predetermined coordinates, to the coordinates of the actual barge positions. These calculations may, of course, be accomplished utilizing conventional trigonometric techniques.

Once the distances between the coordinates of the beginning of the desired course and the computed coordinates of the actual position of the barge along the X and Y axes of the plotter have been computed, actual barge position may be plotted. The scale factors SSF, FSF, and GS utilized in preparing the chart, as well as the distance that the pen and chart move for one plot step or increment PSTEP, may be supplied as data to the computer 114, and the computer 114 may calculate the number of pulses which must be applied to the pen stepping motor 300 and the chart stepping motor 302 of the digital incremental plotter 118 to position the pen at the proper X and Y positions on the chart.

For example, assume that the computer has calculated the coordinates of the actual barge position as being two meters from the beginning of the desired course along the Y axis of the plotter and one meter from the beginning of the desired course along the X axis of the plotter. Assume, further, that the side scale factor SSF and the forward scale factor FSS are both equal, e.g., one inch equals five meters, and that the plot PSTEP is one-hundredths inch, i.e., 100 pulses equal 1 inch. The computer 114 may thus generate a Y signal of 40 pulses and an X signal of 20 pulses of the required polarity to position the pen and chart, respectively, so that the pen is at the calculated X,Y position.

After the barge position has been plotted in this manner, a new barge position may be calculated after a predetermined time interval or when the barge has moved a predetermined distance from the last plotted position. Since the coordinates of the last plotted position may be stored in computer memory, the calculation of the distances to subsequent computed coordinates of actual barge positions along the X and Y axes of the plotter may continue at predetermined intervals until the end of the desired course has been reached.

A conventional chart has been utilized in the above description in order to facilitate an understanding of the plotter command signal computer and generator 206. However, the chart employed in the preferred embodiment of the present invention, as will subsequently be described in more detail, is preferably prepared by dividing the desired course into a plurality of substantially straight-line segments and plotting the segments end-to-end as a substantially continuous straight line parallel to the longitudinal axis of the chart. The grid lines of the predetermined navigational coordinate system may then be plotted relative to each segment of the desired course. Since the desired course appears as a unidirectional line on the chart, i.e., a line without changes in course direction, the orientation of the grid lines may vary relative to a predetermined reference line on the chart for each new desired course segment, assuming that each segment represents a change in the direction of the desired course.

The plotter command signals X and Y generated by the plotter command signal computer and generator 206 may be applied to the input terminals 208 and 210 respectively of the digital plotter 118 to drive a pen stepping motor 300 and a chart stepping motor 302 to position the pen relative to the chart at the coordinates of the actual barge position on the chart. Additionally, pen command signals PENUP and PENDN may be applied to an input terminal 212 of the digital recorder 118 to drive a pen controller 303 to raise the pen out of contact with the chart when in motion and to lower the pen for position plotting as will subsequently be described.

As previously described, it is possible to compute and generate plotter command signals so long as the orientation of the grid lines relative to the X and Y axes of the plotter and the appropriate scale factors are supplied as data to the computer. In utilizing the preferred chart of the present invention, the computer is provided with the coordinates of the beginning and end points of the first desired course segment, i.e., CEI and CNI, the Easting and Northing coordinates, respectively, of the beginning of the desired course segment, and CEO and CNO, the Easting and Northing coordinates, respectively, of the end of the desired course segment. Since the coordinates of two points on the desired course segment are supplied to computer 114, the orientation of the grid lines on the chart relative to the desired course segment may be computed utilizing conventional trigonometric techniques.

Further, since the desired course segment, or at least the beginning and end points of the desired course segment, are on a line parallel to the Y axis of the plotter, the orientation of the grid lines relative to the Y axis of the plotter is the same as the orientation of the grid lines relative to a line drawn between the beginning and end coordinates of the desired course segment. Thus, the computer 114 may determine the orientation of the grid lines relative to the axes of the plotter and may plot actual barge positions at the coordinates thereof. However, when the end of a desired course segment is reached, the computer must be provided with new segment data to calculate the orientation of the grid lines of the next desired course segment relative to the desired course prior to continuing the plotting operation.

A determination that the barge has reached the end of a desired course segment may be made automatically by comparing the coordinates of the last-plotted barge position with the coordinates of the end of the desired course segment, or manually by the operator.

Thus, at the end of any desired course segment, the operator may place the pen of the plotter at the beginning of the new desired course segment and supply new course segment coordinates to the computer 114. The previously described operation may then be repeated for any number of desired course segments until the end of the desired course is reached.

In addition to the above, the plotter command signal computer and generator 206 may provide pen command signals PENUP and PENDN to raise and lower the pen. For example, before applying the pen and chart command signals X and Y to the plotter 118, the computer 114 may be programmed to provide a PENUP signal to the input terminal 212 of the pen controller 303 to raise the pen. After the pen and chart have been moved to position the pen at a new set of actual barge position coordinates, the computer 114 may be programmed to provide a PENDN signal at the input terminal 112 of the plotter 118 commanding the pen controller 303 to lower the pen for plotting. The programming of the computer 114 to provide the PENUP and PENDN signals is well within the state of the art and may be effected in any conventional manner.

When the pen is lowered for position plotting, the plotter command signal computer and generator 206 may also provide a predetermined signal pattern to move the pen and chart in a predetermined manner to thereby plot a particular symbol at the coordinates of actual barge position. For example, the pattern may be such that an X is plotted at the computed coordinates until the coordinates of a fitting are reached.

At this point, in addition to the printing of the ranges to the transponders by the teleprinter as previously described, the plotter command signal computer and generator 206 may provide a different signal pattern. Thus, a different symbol may be plotted at the coordinates of the position of a fitting to identify the fitting position on the chart at a later date.

While the computer has been broken down into the above-described functional components in order to facilitate an understanding of the operation thereof, the computer 114 is preferably a single, general purpose ditigal computer properly programmed to accomplish the above results. The data supplied to the computer 114, with the exception of the range data, may be provided by way of any conventional input device, such as a card reader, tape reader, or the like as previously described. This data may be stored in the computer memory or on tape for later recall when needed for a particular purpose.

The recall and use of the data in the desired calculations may, of course, be controlled by any suitable computer program capable of performing the previously described function. Such programs are well within the scope of an experienced computer programmer, given the above functional description of the operation of the computer, its peripheral equipment, and the knowledge of one skilled in the arts relating to navigational position determining and plotting.

THE PLOTTER

The plotter of the present invention is preferably an incremental digital plotter having a horizontal table or bed 312 which provides a stationary, planar surface over which the elongated web or chart 310 may be advanced, such as the model DP1-1 plotter manufactured by Houston Instruments.

Figure 9:
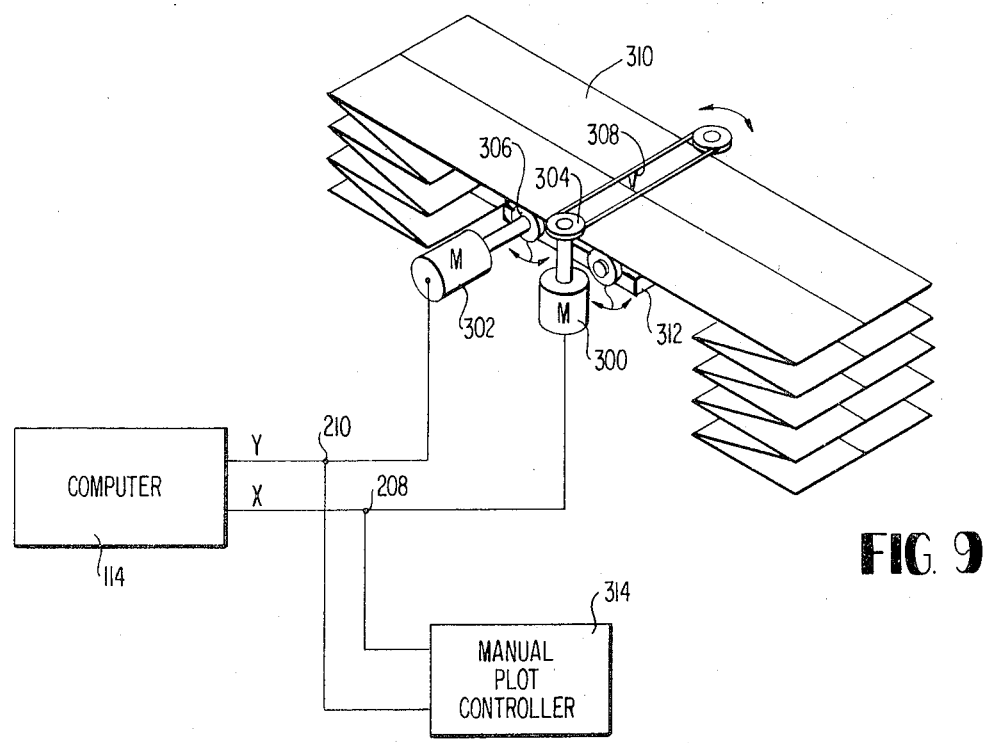
FIG. 9 is a functional diagram of the preferred plotter illustrated in FIG. 6.

Referring now to FIG. 9 wherein the plotter utilized in the present invention is illustrated functionally, the plotter command signals X and Y may be applied by way of the input terminals 208 and 210 to stepping motors 300 and 302, respectively. The stepping motors 300 and 302 may be connected respectively in a conventional manner to a pen drive assembly 304 and a web or chart drive assembly 306. The rotary movement of the motor 300 is converted into linear movement of the pen 308 along the X axis of the plotter, i.e., along a line perpendicular to the longitudinal axis of the plotter. Similarly, the rotary movement of the motor 302 is converted into linear movement of the chart 310 along the Y axis of the plotter, i.e., along a line parallel to the longitudinal axis of the plotter.

A manual plot controller 34 may also be connected to the input terminals 208 and 210 of the plotter to provide manual control thereof.

In operation, the pen 308 may conveniently be positioned at the beginning of the desired course segment by the operation, by means of the manual plot controller 314. The operator may then depress a switch, signifying that the pen 308 is in position at the beginning of a particular desired course segment and initiating the position plotting program of the computer 114.

The necessary data, if not already in computer memory, may be read into the computer and a first set of range values may likewise be accepted. The computer 114 may then calculate the number of pulses which must be applied to the stepping motors 300 and 302 of the plotter to position the pen 308 at the calculated actual barge position on the chart.

A first group of pulses related in number to the distance from the present pen position to the X coordinate of the barge position on the chart 310 may be applied to the motor 300 to position the pen at the X coordinate of actual barge position. A second group of pulses related in number to the distance from the present pen position to the computed Y coordinate of the actual barge position on the chart 310 may be applied to the motor 302 to advance the chart 310 so that the pen 308 is directly over the computed Y coordinate of the actual barge position. When the pen is in position, additional plotter command signals may be applied to the stepping motors 300 and 302 to plot a predetermined symbol at that point on the chart 310.

Although not illustrated in FIG. 9, the computer 114 may also provide a PENUP signal to raise the pen 308 during the positioning of the pen 308 and the chart 310, and a PENDN signal to lower the pen 308 to perform the plotting operation.

While the incremental plotter of the lay barge or work vessel position plotting system of the present invention is preferred, it is to be understood that any suitable incremental plotter utilizing a web or elongated chart, either fan-folded or on rolls, may be satisfactorily employed.

THE CHART

As previously described, the chart utilized in conjunction with the present invention may be prepared in the conventional manner by plotting grid lines of a predetermined navigational coordinate system thereon relative to a predetermined reference line. This reference line may be the center line or one edge of a chart as illustrated in FIG. 10.

Figure 10:
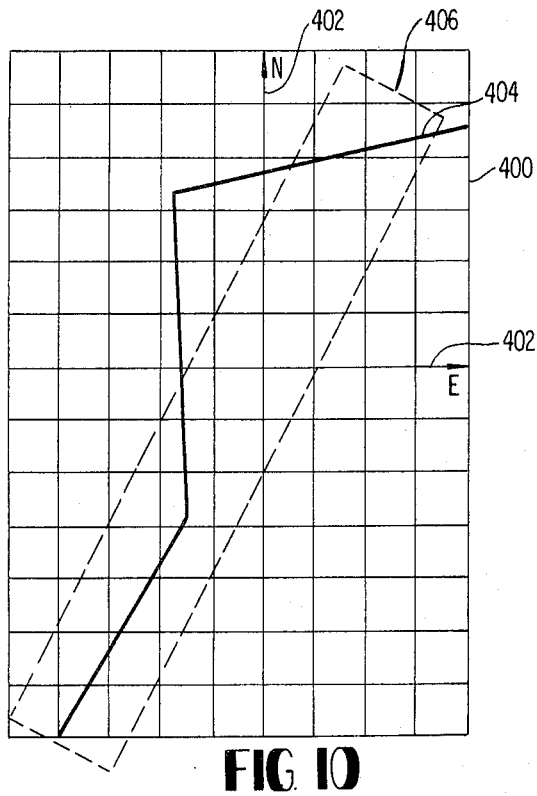
FIG. 10 illustrates a conventional navigational chart.

With reference to FIG. 10, a chart 400 (corresponding to 120) having grid lines preplotted thereon may suffice for the manual plotting of actual barge positions relative to a preplotted, desired course 404. However, because of the accuracy required and the distances involved, it may be impractical to employ a chart such as that illustrated due to the cumbersome size. The ideal solution is, of course, to plot the desired course 404 (corresponding to 124) on a relatively narrow, elongated chart 406 illustrated in phantom. However, since the desired course 404 may vary erratically in direction, it may be impossible to plot the desired course 404 within the confines of the chart 406 while retaining the scale factors needed for precision. Preparation of the chart as described below provides an excellent solution to this problem.

Figure 12:
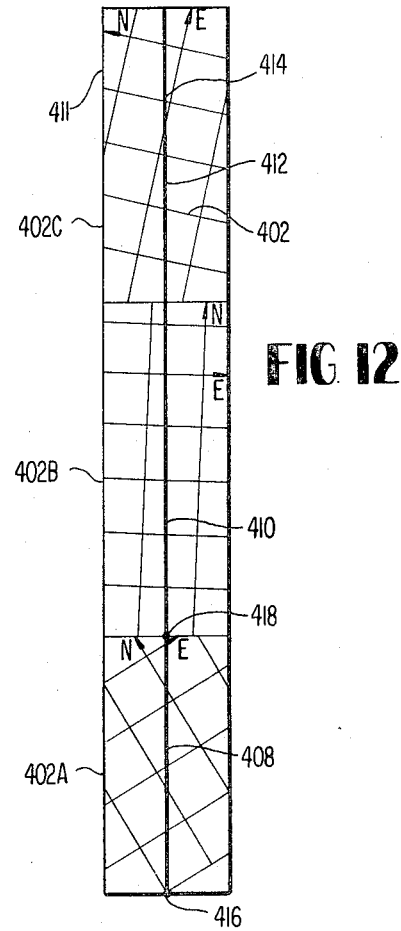
FIGS. 11–13 illustrate various navigational charts and show the construction of a preferred navigational chart utilized in connection with the system of FIG. 6.
Figure 11:
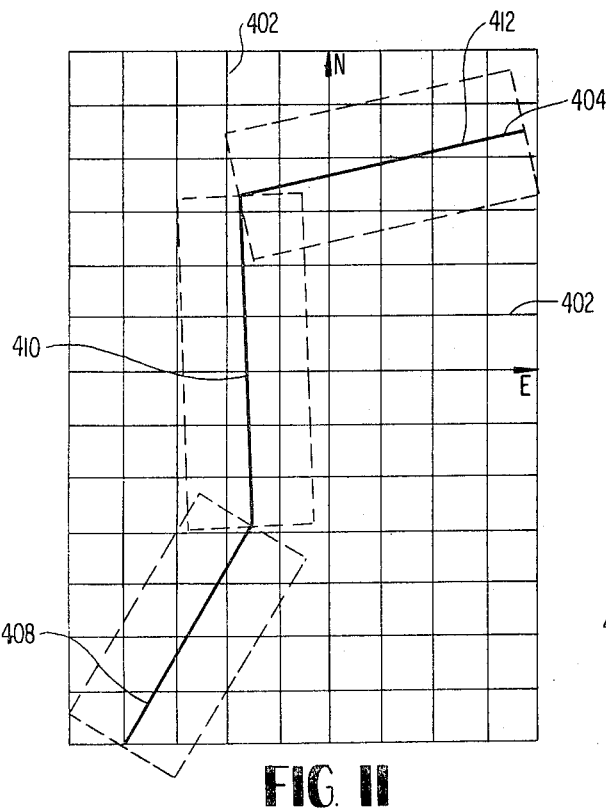

Referring now to FIG. 11, a preferred chart of the present invention may be prepared by first dividing the desired course 404 into a plurality of substantially straight-line segments 408, 410, and 412. Each segment may be plotted, as illustrated in FIG. 12, in an end-to-end relation on an elongated chart as a substantially continuous, straight line 414 parallel to the longitudinal axis of the chart 411. As is by now apparent, this involves the effecting of relative rotation between at least two adjacent grids and route or course line segments so as to produce a route or course plot which is "straightened out" so as to narrow the distance between lateral boundaries of the plot.

The orientation of the individual segments 402A, 402B and 402C of grid lines 402 relative to their associated route or course line segments 408, 410 and 412 of the desired course is retained and therefore the orientation of the grid lines of each segment relative to a predetermined reference line on the chart 411 may differ substantially as the desired course changes.

Figure 13:
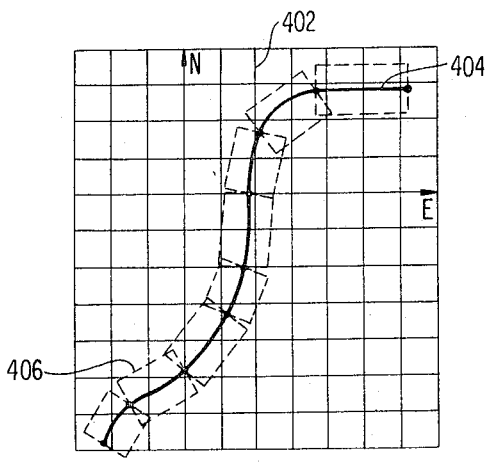

While each of the segments 408, 410 and 412 are illustrated ideally as straight lines running between the coordinates of the beginning 416 of a segment 408 and the coordinates of the end 418 of the segment 408, in practice the segments of the desired course 404 may have some curvature, as illustrated in FIG. 13. For example, in the laying of pipelines, it may be desirable to avoid sharp bends in the pipeline because of the extreme mechanical stresses which might result. In this event, the desired course 404 may be divided into any number of small segments to reduce the curvature of any segments. Thus, by using smaller segments, any practical course may be divided into substantially straight segments.

The chart of the present invention may be plotted in the following manner. The desired course 404 may be divided into a plurality of segments, as previously described, and the coordinates of the beginning and each of each segment may then be provided as input data to the computer 114. The operator may then place the pen of the incremental digital plotter at approximately the center of the web or elongated chart disposed thereon, after which he may initiate a program for the plotting of the first segment. The computer, utilizing the coordinates of the beginning and end points of the first segment, may then determine the length of the first segment and determine the number of pulses which must be applied to the chart stepper motor to draw a scaled line of the required length on the chart. A line representing the first segment of a desired course may then be drawn by advancing the chart and the chart thereafter returned to its initial position.

The computer may then determine the orientation of the grid lines relative to the first segment of the desired course. The grid lines may then be drawn, and at the completion of the last grid line, the pen may be positioned automatically or by the operator, at the coordinate of the beginning of the next desired course segment, at which time the process is repeated utilizing the coordinate data for the next segment of the desired course. The grid lines need not be actually drawn on the chart except for manual verification of barge position by the operator or to facilitate the later reading of the chart.

The course data utilized in preparing the chart 411 may, of course, be stored in computer memory for later use in plotting the actual barge positions, or may alternatively be stored on punched cards or tape. Additionally, it should be apparent that the order of plotting the desired course line and the grid lines may be reversed if desired.

IMPROVED RANGE MEASURING SYSTEM

Figure 14:
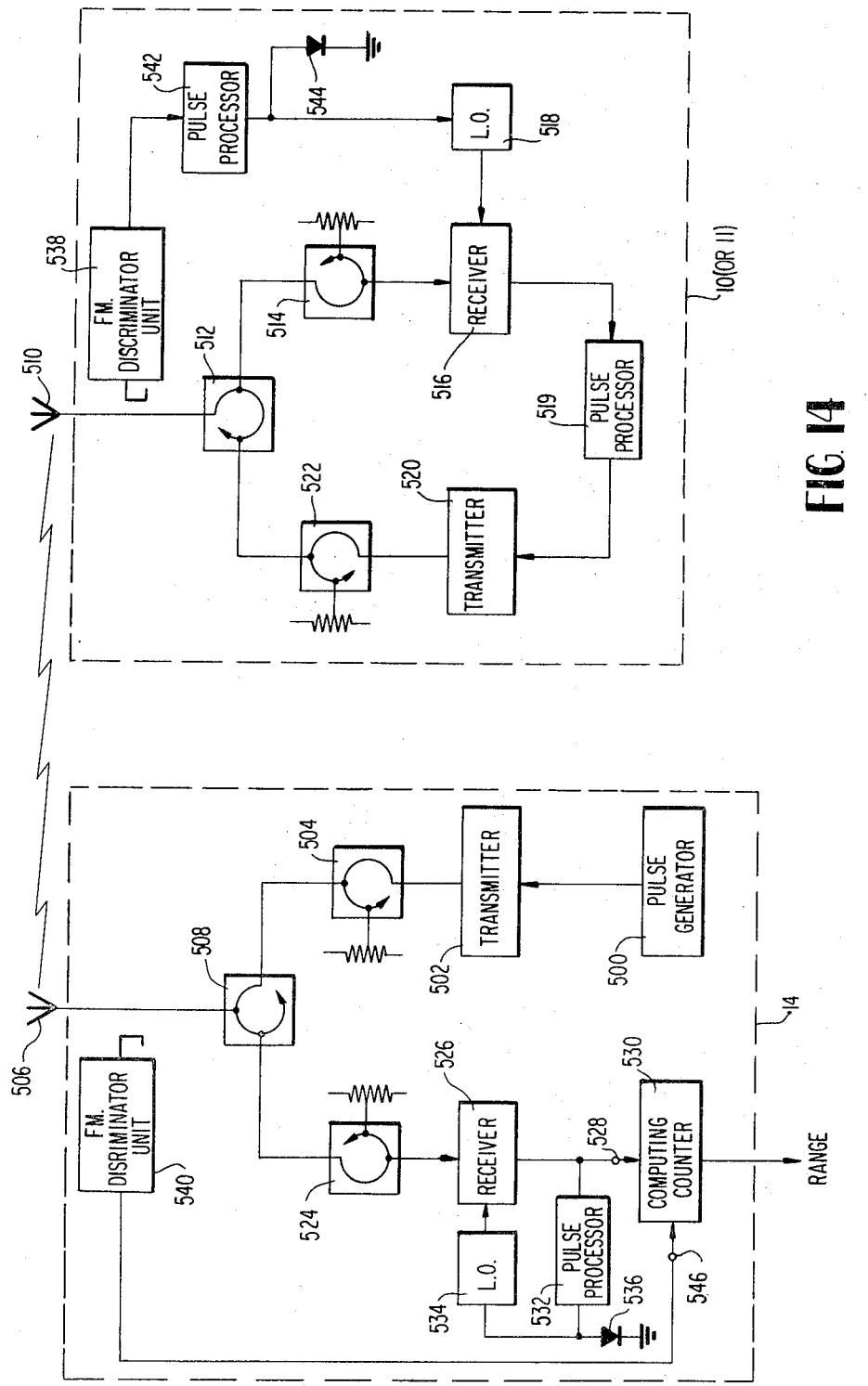
FIG. 14 is a functional block diagram of an improvement embodiment of the range measuring system of FIG. 1.
Figure 16:
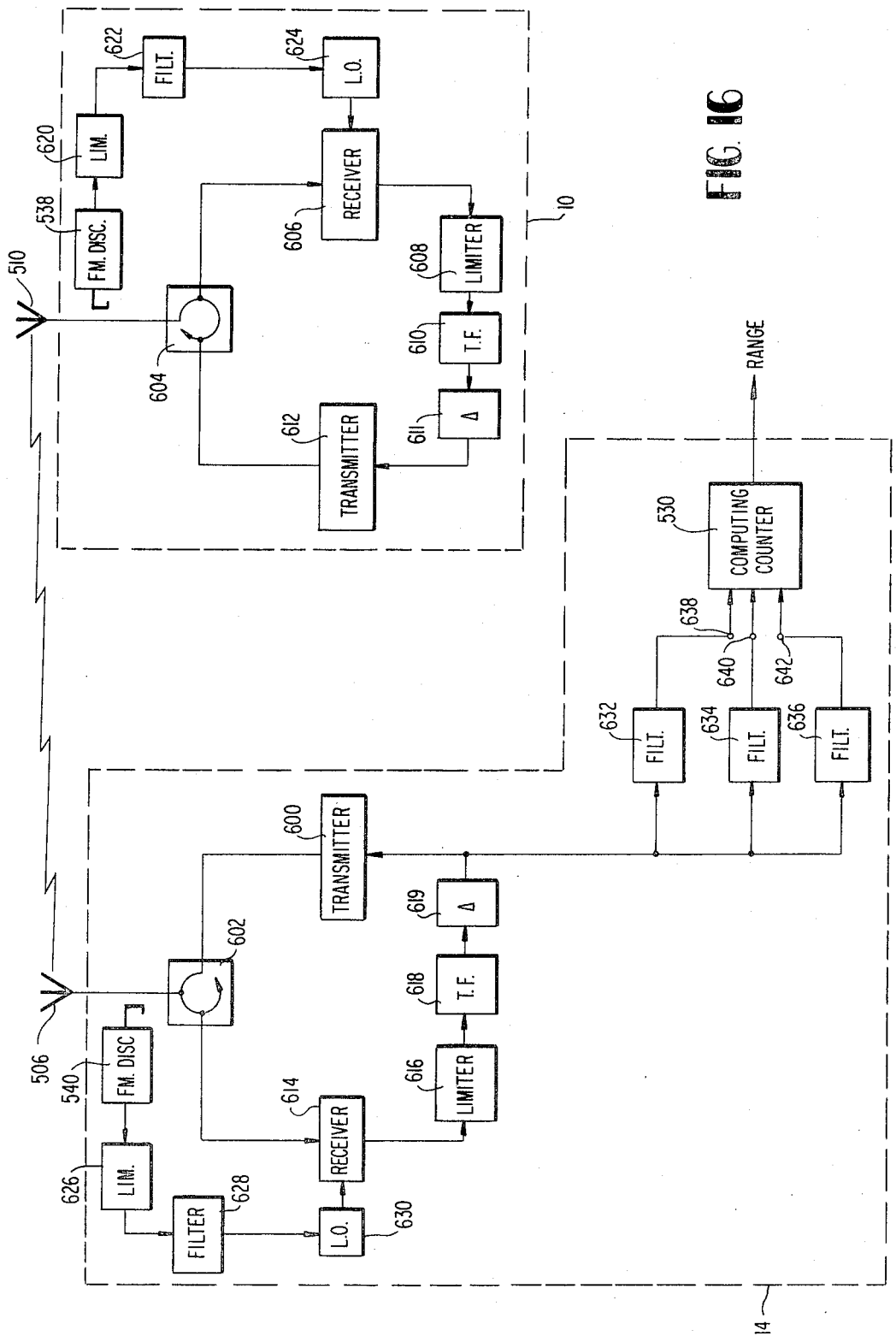
FIG. 16 is a functional block diagram of another improvement embodiment of the range measuring system of FIG. 1.

Functional block diagrams of two embodiments of an improved range measuring aspect of the present invention are illustrated in FIGS. 14 and 16. This improvement aspect is disclosed in the aforesaid Reeves application, Ser. No. 123,227.

In general, as shown in FIG. 14 and FIG. 1, the interrogator unit 14 at one location transmits an interrogation signal(s) to the responder 10 and/or 11 at a remote location. The responder 10 and/or 11 receives the interrogation signal(s) and generates a response signal(s) which is transmitted back to the interrogator unit 14 for processing to provide range data.

Ranging systems of this type depend on a measurement of the time interval between the transmission of a signal and the return of the same or a responsive signal to the transmission site. While there are various ways of determining this time interval, e.g., elapsed time between transmission and reception of a pulse or phase and frequency measurement techniques, all signal delays other than the delay related to the propagation time of electromagnetic wave energy through the atmosphere between the two locations introduce errors into the range data. Because of the nature of the equipment utilized in obtaining the range data, this range data will ordinarily contain errors due, for example, to changes in temperature, to aging of components, and to Miller effect delays caused by variations in signal level. Since all of these conditions cause signal delays which may vary unpredictably, fixed correction techniques based on calculations of the delays under one set of conditions are inaccurate under the varying conditions to which the system is subjected in use. The improved range measuring aspect now to be discussed eliminates this problem by providing, among other things, a dynamic correction for these unpredictable varying delays.

Pulsed Embodiment

With reference now to FIG. 14, the output signal from a pulse generator 500 is applied to a suitable conventional voltage controlled frequency modulated (FM) transmitter 502. The pulse generator 500 may provide positive pulses at predetermined intervals, e.g., at one millisecond intervals, which rapidly (e.g., within a few nanoseconds) change the frequency $f_o$ of the carrier signal from the transmitter 502 to a higher frequency $f_o+\Delta f$ and maintain the frequency at this higher, discrete level for the duration of each pulse. Thus, each time a pulse from the pulse generator 500 is applied to the FM transmitter 502, a time reference mark represented by a rapid change in carrier frequency of the transmitter 502 is generated. The output signal from the transmitter 502 may be applied through a suitable conventional isolator 504, such as the resistively terminated circulator illustrated, to a phased array, parabolic disk or other suitable conventional antenna 506 by way of a suitable conventional directional coupler 508, e.g., a circulator or T/R tube.

The signal applied to the antenna 506 is transmitted in the form of electromagnetic wave energy, i.e., radiated, toward the responder 10 or 11 and is detected at the responder 10 or 11 by a suitable conventional antenna 510. This detected or received signal is applied via suitable cable or waveguide and through a suitable conventional directional coupler 512 and a conventional isolator 514 to a conventional FM receiver 516 tuned to the carrier frequency of the transmitter 502. The received signal is amplified by the receiver 516 and is beat with the output signal from a suitable local oscillator 518 to provide an intermediate frequency (IF) signal for further amplification by the IF amplifiers in the receiver 516 and for subsequent detection in a conventional manner of the frequency changes or modulation relative to the carrier frequency $f_o$.

The receiver 516 detects any frequency shift or modulation of the received signal, e.g., the time reference marks on the transmitter 502 carrier signal, and the detected modulation signal from the receiver 516 is applied through a suitable noninverting pulse processing circuit 519 to a conventional voltage controlled FM transmitter 520. The output signal from the transmitter 520 is a carrier signal at a predetermined frequency $f_o$ which is modulated in accordance with the output signal from the pulse processing circuit 519. The transmitter output signal may be applied through a suitable isolator 522 and through the directional coupler 512 to the antenna 510. The signal from the transmitter 520 is radiated by the antenna 510 towards the interrogator unit 14 where the signal is detected by the antenna 506.

The signal from the responder 10 detected by the antenna 506 is applied through the directional coupler 508 and through a suitable conventional isolator 524 to a suitable conventional FM receiver 526. The receiver 526 operates, as was previously described in connection with the receiver 516, to amplify and detect the FM modulation of the received or detected signal. The FM modulation signal from the receiver 526 is applied to an input terminal 528 of a computing counter 530 and to the noninverting input terminal of a pulse processing circuit 532 of the type previously described. The output signal from the pulse processing circuit 532 is applied to a local oscillator 534 which controls the IF frequency of the receiver 526. This output signal is also applied to the anode electrode of a conventional semiconductor diode, the cathode electrode of which is connected directly to signal common or ground potential.

In both the responder 10 and the interrogator 14, suitable conventional FM discriminator units 538 and 540, respectively, are provided on the antenna sides of the respective directional couplers 512 and 508. The discriminator units 538 and 540 are preferably positioned as close as possible to the antennas 510 and 506, respectively, and may be provided within or on the antennas where possible. The discriminator units 538 and 540 detect certain of the signals transmitted by the respective antennas 510 and 506 while ignoring any signals received thereby. A resonant cavity type discriminator utilizing temperature insensitive resonant cavities, e.g., an Envar microwave discriminator, is preferred.

The discriminator units 538 and 540 are tuned to the frequency $f_o$ at which the transmitters 502 and 520 normally transmit in the absence of the application of modulating pulses thereto. Thus, when the transmitters 502 and 520 are transmitting at the frequency $f_o$, the output signals from the discriminator units 538 and 540 are conveniently at a zero volt d.c. level. When the transmitted signals are frequency modulated, for example, when a time reference mark is generated by changing the frequency of the output signals from the transmitters from $f_o$ to $(f_o \pm \Delta f)$, the output signals from the discriminator units 538 and 540 assume a corresponding positive or negative signal level proportional to the amount and direction of deviation of the frequency of the detected transmitted signal from the frequency $f_o$.

The output signal from the FM discriminator unit 538 is applied to the inverting input terminal of a suitable conventional pulse processing circuit 542 of the type previously described and the output signal from the pulse processing circuit 542 is applied to the local oscillator 518 and is also applied to the anode electrode of a conventional semiconductor diode 544, the cathode electrode of which is connected directly to signal common or ground potential.

The output signal from the FM discriminator unit 540 in the interrogator unit 14 is applied to an input terminal 546 of the computing counter 530 either directly, as illustrated, or through a suitable pulse processing circuit (not shown).

Figure 15:
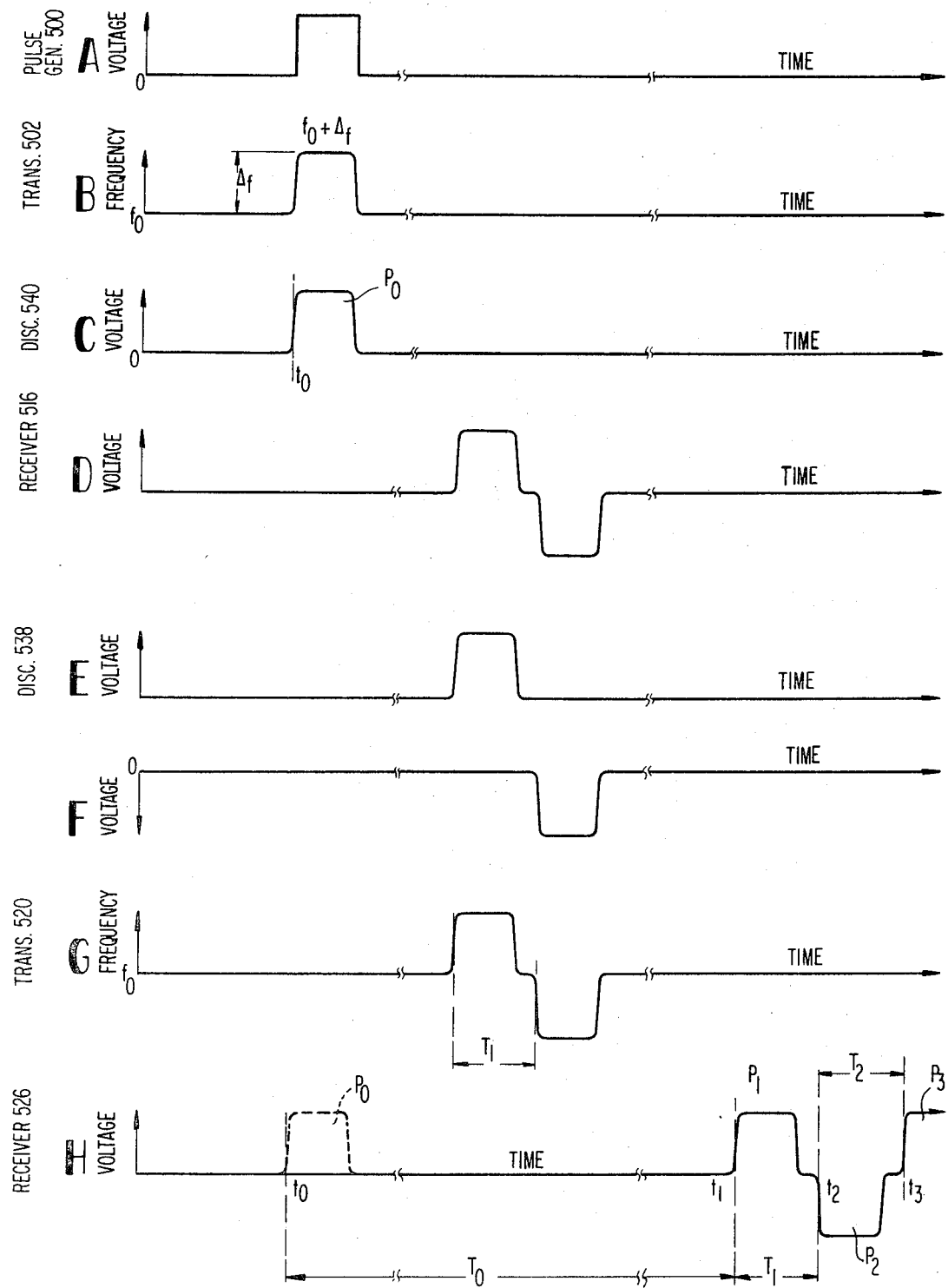
FIG. 15 illustrates waveforms at various points in the system of FIG. 14.

The operation of the range measuring system of FIG. 14 may be more clearly understood with reference to FIG. 15 where typical waveforms at various points in the system are illustrated. Referring now to both FIGS. 14 and 15, the pulse generator 500 provides a series of pulses of waveform A, for example, a series of positive pulse of 0.1 microseconds duration at a repetition rate of 1.0 KHz. These pulses are utilized to modulate or vary the frequency of the output signal from the transmitter 502 to provide time reference marks illustrated in waveform B of FIG. 15. A time reference mark, i.e., the frequency change from $f_o$ to $(f_o+\Delta f)$, is detected by the FM discriminator unit 540. The output signal from the FM discriminator unit 540 is a pulse $P_o$ proportional in amplitude and duration to the amplitude and duration of the frequency modulation $\Delta f$ of the transmitted signal (waveform C of FIG. 15). This pulse $P_o$ is applied to the input terminal 546 of the computing counter 530 to initiate a counting or timing cycle at a time $t_o$.

At some later time, the transmitted signal is received at the responder unit 10, is demodulated to detect time reference marks, and the demodulated signal from the receiver 516 (waveform D of FIG. 15) is applied to noninverting input terminal of the pulse processing circuit 519. The pulse processing circuit 519 is preferably a Model No. 7832743001 bipolar pulse processing circuit manufactured by Collins Radio Corporation of Cedar Rapids, Iowa, and responds to the application of both positive and negative pulses. The pulse processing circuit 519 prevents receiver noise from modulating the transmiter 520 while allowing detected modulation to modulate the transmitter 520. Additionally, the pulse processing circuit 519 removes noise from the receiver 516 detected modulation signal, provides correct signal amplitude for modulating the transmitter 520 and insures that the transmitter 520 is modulated at a time occurring approximately half-way between the 10 percent and 90 percent amplitude points of the detected receiver modulation signal.

The pulse processing circuit 519 thus modulates the output signal from the transmitter 520 at the approximate center of the rise time of the demodulated signal from the receiver 516 for the duration of the detected demodulated signal or time reference mark. The frequency modulation of the transmitter 520 output signal, i.e., the time reference mark, is detected by the FM discriminator unit 538 and is also transmitted back to the interrogator unit 14, where it is received by the antenna 506.

The output signal from the FM discriminator unit 538 (waveform E of FIG. 15) is applied to the inverting input terminal of the pulse processing circuit 542 which operates as was previously described to eliminate excess noise to establish the desired signal amplitude and invert the signal to provide a pulse having a negative d.c. level. This negative pulse from the pulse processing circuit 542 back-biases the diode 544 to prevent the conduction thereof, and thus reduces the frequency of the local oscillator 518 for the duration of the pulse. Since the frequency of the local oscillator 518 is reduced, the receiver IF frequency decreases proportionally and the receiver 516 generates a pulse having a negative d.c. level, as illustrated by waveform F of FIG. 15. This negative pulse is processed by the pulse processing circuit 519 previously described and the pulse processing circuit output signal drives the frequency of the output signal from the transmitter 520 in a negative direction, for example to $(f_o-\Delta f)$, for the duration of this negative pulse. Thus, the frequency of the transmitter 520 output signal is first increased to $(f_o+\Delta f)$ and then decreased to $(f_o-\Delta f)$, as illustrated in waveform G of FIG. 15.

The negative modulation is also detected by the FM discriminator unit 538, limited, and inverted. However, the inverted output signal from the pulse processing circuit 542 is a pulse having a positive signal level and this signal does not affect the local oscillator 518 since positive signals are shunted to ground through the diode 544.

The time interval $T_1$ between the approximate center of the leading edge of the negative modulation signal (see waveform G of FIG. 15) is approximately equal to the signal delay introduced by the responder unit 10. Since this time interval $T_1$ is generated dynamically and varies in accordance with equipment induced variations in signal delay through the responder unit 10, a dynamic, highly accurate indication of signal delay through the responder unit 10 is provided and can be subtracted from the total propagation time in a manner subsequently to be described.

With continued reference to FIGS. 14 and 15, the transmitted signal from the responder 10 is detected by the antenna 506 of the interrogator unit 514 and is applied through the directional coupler 508 and the isolator 524 to the receiver 526. The receiver 526 demodulates the received or detected signal and the demodulated output signal, illustrated by waveform H of FIG. 15, is applied to the computing counter 530 and to the non-inverting input terminal of the pulse processing circuit 532 which operates in the manner previously described. The pulse processing circuit 532 processes both the positive and negative pulses from the receiver 526, and the positive pulses are shunted to ground through the diode 536 while the negative pulses are applied to the local oscillator 534. The local oscillator 534 may be designed so that the frequency or the output signal therefrom varies inversely with the polarity of the input signal applied thereto. Thus, the negative pulse effects an increase in the frequency of the local oscillator, thereby increasing the receiver IF frequency and in turn causing the receiver 526 to generate a pulse having a positive signal level.

This generated positive pulse from the receiver 526 is applied to the computing counter 530 and the pulse processing circuit 532. The pulse processing circuit 532 generates a positive pulse in response to this positive pulse input signal. However, the local oscillator frequency is unaffected by this second pulse since it is shunted to ground through the diode 536.

The output signal from the receiver 526 illustrated by waveform H of FIG. 15 thus includes three pulses. A first positive return pulse or time reference mark $P_1$ commencing at time $t_1$ is related in time to the pulse $P_o$ (waveform C) in accordance with the total propagation time (including equipment delays) of a time reference mark through the interrogator unit 14, the atmosphere and responder unit 10. A negative return pulse or time reference mark $P_2$ commencing at time $t_2$ is related in time to the pulse $P_1$ according to the signal delay introduced by the equipment in the responder 10, i.e., the IF, detector and output stages of the receiver 516, the pulse processing circuit 519, the transmitter 520, the isolator 522, the directional coupler 512 and the cables or waveguide connecting these components. A second positive pulse or time reference mark $P_3$ commencing at time $t_3$ is related in time to the pulse $P_2$ according to the signal delay through the receiver channel of the interrogator unit 14, i.e., the IF, detector and output stages of the receiver 526.

With continued reference to FIG. 15, the time intervals between the pulses $P_o$, $P_1$, $P_2$ and $P_3$ are related as follows:

| Pulses | Time of Occurrence | Time Interval Between Pulses |
|---|---|---|
| $P_o$ and $P_1$ | $t_o$ and $t_1$ | $T_o$ (total uncorrected propagation time) |
| $P_1$ and $P_2$ | $t_1$ and $t_2$ | $T_1$ (equipment delay of responder) |
| $P_2$ and $P_3$ | $t_2$ and $t_3$ | $T_2$ (equipment delay of interrogator) |
| $P_1$ and $P_3$ | $t_1$ and $t_3$ | $T_1 + T_2$ (total equipment delay) |

It can be seen from the above table that the total propagation time attributable to the propagation of the wave energy through the atmosphere may be calculated by subtracting the total equipment delay ($T_1+T_2$) from the total uncorrected propagation time $T_o$. The calculation $T_0 - (T_1+T_2)$ provides a highly accurate corrected propagation time $T_p$ related to the range R between the interrogator unit 14 and the responder unit 10.

It should be noted that the equipment delays represented by $T_1$ and $T_2$ above take into account the major delays introduced by that equipment through which the signal delays are most likely to vary in an unpredictable manner, e.g., the transmitters and receivers. However, some equipment delays may not be reflected in the time intervals $T_1$ and $T_2$. For example, the time interval $T_1$ does not include the amount of signal delay time in the responder unit 10 between the antenna 510 and the mixer (not shown) in the receiver 516 where the local oscillator 518 signal is mixed with the received signal.

Additionally, some equipment delay times not included in the total uncorrected propagation time interval $T_o$ of the overall loop are included in the calculated time intervals $T_1$ and $T_2$. For example, the signal delay time introduced by the FM discriminator unit 538, the limiter 542 and the local oscillator 518 is not included in the time interval $T_o$ but is included in the responder loop time interval $T_1$. These noncommon delay times not common both to the overall loop defined by $T_o$ and to either the responder 10 or the interrogator 14 internal loops defined by $T_1$ and $T_2$ are relatively small. Since highly stable components, e.g., the Envar discriminator and the direction couplers, appear in these portions of the loops, these delay times are relatively constant.

However, for even greater accuracy, these noncommon signal delay times in both the interrogator unit 14 and the responder unit 10 may be determined and subtracted from the proper time interval. For example, the noncommon signal delay caused by the pulse processor 532 and the local oscillator 534 in the interrogator 14 internal loop may be subtracted from the dynamically calculated time interval $T_2$. The noncommon signal delay caused by the directional coupler 508, the isolator 524 and the radio frequency (RF) amplifiers (not shown) in the receiver 526 (i.e., the receiver 526 stages prior to the mixer), as well as the delay caused by the directional coupler 512, the isolator 514 and the RF amplifiers in the receiver 516, may be subtracted from the calculated time interval $T_o$. These subtractions may be effected by the computing counter 530 as will hereinafter be described.

The calculation of corrected propagation time $T_p$ is accomplished by the computing counter 530. As was previously mentioned, the counting or timing cycle is commenced by detecting the FM modulation signal at or near the antenna 506 generating the pulse $P_o$ to simultaneously start a clock or counter in the computing counter 530. This clock or counter is disabled upon receipt of the positive return pulse $P_1$ and a second clock or counter is enabled by this first received positive return pulse. The next positive pulse $P_3$ disables the second counter or clock. The total time recorded on the second clock, i.e., the total responder and interrogator delay time ($T_1+T_2$), is then subtracted from the total time $T_o$ recorded on the first clock, resulting in a total corrected propagation time $T_p$ which has been dynamically corrected for equipment delays.

The signal delay introduced through the transmitting channel of the interrogator unit 14 is not needed for correcting the total propagation time for undesired delays since the counting or timing cycle is commenced by the detected frequency modulation signal at or near the antenna. However, as was previously mentioned, the relatively fixed delays in the internal interrogator and responder loops are not common to the overall range loop and the relatively fixed delays in the overall range loop which are not common to the internal interrogator and responder loops may be subtracted from the appropriate intervals $T_0$, $T_1$ and $T_2$ by properly programming the computing counter 530 in a well known manner.

This total corrected propagation time $T_p$ may then be translated into the one-way range between the interrogator unit 14 and the responder 10 by multiplying the time interval by the propagation speed of electromagnetic wave energy in the atmosphere, i.e., approximately the speed of light, and thereafter dividing by two to obtain the one-way range.

The computing counter 530 is preferably a commercially available Hewlett Packard Model No. 5360 computing counter which is programmable by the insertion of integrated circuit chips to operate on several input signals in the manner described above. Thus, all of the foregong mathematical calculations, i.e., the calculation of corrected propagation time and distance, may be performed automatically in accordance with a hard wired program inserted in the Hewlett Packard computing counter.

The transmitter 502 and the receiver 526 in the interrogator unit 14 may be a Model No. 50T26-1 transceiver and the transmitter 502 and receiver 516 in the responder unit may be a Model No. 50T25-1 transceiver, both of which are manufactured by Collins Radio. Other models which function similarly may be utilized for other frequency requirements.

It should be noted that the pulse processing circuits 519, 532 and 542 may be identical Collins Radio Model No. 7832743001 bipolar pulse processors providing inversion or noninversion of the input signals as was previously described. However, the pulse processing circuit 542, for example, may alternatively be a Collins Radio Model No. 7832745001 unipolar pulse processor which passes pulses of only one polarity, thereby eliminating the necessity for the diode 544.

CONTINUOUS WAVE EMBODIMENT

A continuous wave embodiment of the range measuring system of the present invention is illustrated in FIG. 16 wherein like numerical designations have been utilized to designate elements previously described in connection with FIGS. 1 and 6.

Referring now to FIG. 16, the output signal from a suitable conventional FM transmitter 600 in the interrogator unit 14 is applied through a conventional directional coupler 602, e.g., a suitable conventional circular or T/R tube, to the antenna 506. This signal is transmitted by the antenna 506 in the form of electromagnetic wave energy toward the responder unit 10 where the wave energy is detected by the antenna 510.

The signal detected by the antenna 510 is applied through a suitable conventional directional coupler 604 to a conventional FM receiver 606. The output signal from the receiver 606 is applied through a conventional wideband limiter 608, a conventional tracking filter 610 and a suitable fixed delay circuit 611 to a suitable conventional FM transmitter 612. The output signal from the transmitter 612 is applied through the directional coupler 604 to the antenna 510 and is transmitted back to the interrogator unit 14, where it is detected by the antenna 506. The signal detected by the antenna 506 is applied through the directional coupler 602 to a suitable conventional FM receiver 614 and the output signal from the receiver 614 is applied through a conventional wideband limiter 616, a tracking filter 618 and a suitable conventional delay circuit 619 to the transmitter 600.

The arrangement described above forms a closed loop (hereinafter referred to as the loop $L_1$) which includes all of the equipment in the transmitting and receiving channels of the interrogating unit 14 and the responder unit 10, as well as the transmission and return path, i.e., twice the atmosphereic path of some length R between the antennas 506 and 510. By establishing a loop gain in excess of one, e.g., by proper selection of various amplification factors in the closed loop, the closed loop $L_1$ will sustain oscillations at a frequency $f_1$ related to the total signal delay through the entire loop.

FM discriminator units 538 and 540 are provided, respectively, in the responder unit 10 and the interrogator unit 14. These discriminator units 538 and 540 detect the FM modulation of the output signals from the transmitters 612 and 600, rspectively, at a location preferably at or adjacent to the respective antennas 510 and 506. The output signal from the FM discriminator unit 538 in the responder 10 is applied through a suitable wideband limiter 620 and a suitable filter 622 to a suitable local oscillator 624 which conrols the IF frequency of the receiver 606. The output signal from the FM discriminator unit 540 in the interrogator 14 is applied through a suitable wideband limiter 626 and a suitable filter 628 to a suitable local oscillator 630 which controls the IF frequency of the receiver 614.

The above FM discriminator arrangements form closed loops within the interrogator unit 14 and the responder unit 10 which oscillate at frequencies related to equipment delays. For example, in the interrogator unit 14, the closed loop (hereinafter referred to as the loop $L_2$) includes the FM discriminator unit 540, the limiter 626, the filter 628, the local oscillator 630, the IF and output stages of the receiver 614, the limiter 616, the tracking filter 618, the delay circuit 619, the transmitter 600 and the directional coupler 602. This loop $L_2$ oscillates at a frequency $f_2$ related to the total signal delay through the entire loop $L_2$ which includes a major portion of the loop $L_1$. In the responder unit 10, the closed loop (hereinafter referred to as $L_3$) includes the FM discriminator unit 538, the limiter 620, the filter 622, the local oscillator 624, the IF and output stages of the receiver 606, the limiter 608, the tracking filter 610, the delay circuit 611, the transmitter 612 and the directional coupler 604. This loop $L_3$ oscillates at a frequency $f_3$ related to the total signal delay through the entire loop $L_3$ which includes a major portion of the loop $L_1$.

The three loop signals having frequencies $f_1$, $f_2$ and $f_3$ respectively may be monitored at a convenient point in the system, separated and utilized to calculate range as will hereinafter be described in greater detail. For example, the output signal from the delay circuit 619 may be applied to three parallel filter circuits 632, 634 and 636. The output signals from the filter circuits 632, 634 and 636 may in turn be applied to the respective input terminals 638, 640 and 642 of a conventional computing counter 530, e.g., the Hewlett Packard Model No. 5360 computing counter previously described.

The delay circuit 619 in the interrogator unit 14 is common to the loops $L_1$ and $L_2$. The delay circuit 611 in the responder unit 10 is common to the loops $L_1$ and $L_3$. To insure that the signal having frequencies $f_1$, $f_2$ and $f_3$ are sufficiently separated in frequency to allow each of the filters 632–636 to pass only a desired one of these signals, the delay circuit 619 may be designed, for example, to cause a much greater signal delay than the delay circuit 611. The natural frequency of oscillation $f_1$ of the loop $L_1$ will thus be low relative to the natural frequencies $f_2$ and $f_3$ respectively of the loops $L_2$ and $L_3$, since the loop $L_1$ includes both delay circuits 611 and 619 as well as the atmospheric path between the antennas 506 and 510. The natural frequencies $f_2$ and $f_3$ respectively of the loops $L_2$ and $L_3$ will be separated from each other by at least an amount proportional to the difference in the signal delays introduced by the respective delay circuits 619 and 611.

Further fixed delays may be added to the various loops if further frequency separation is desired. As long as these further fixed delays are common to the loop $L_1$ and one of the loops $L_2$ and $L_3$, the addition of the fixed delay will not affect the calculation of range or distance as is hereinafter described. However, if a fixed delay is included in one of the loops $L_2$ and $L_3$ which is not common to the loop $L_1$, then a compensation for the amount of the fixed delay must be included in the distance calculation performed by the computing counter as will hereinafter become apparent.

The three frequencies $f_1$, $f_2$ and $f_3$ represent time intervals $T_{S1} = (1/f_1)$, $T_{S2} = (1/f_2)$ and $T_{S3} = (1/f_3)$. The time interval $T_{S1}$ is related to the distance R between the interrogator unit 14 and the responder 10 and includes the signal delay introduced by the equipment in these units, i.e., in the remainder of the loops $L_1$. The time intervals $T_{S2}$ and $T_{S3}$ are related to the signal delays, in particular the unpredictable varying delays, introduced by the major portion of the equipment in the loop $L_1$, i.e., in the interrogator unit 14 and the responder unit 10, respectively. These time intervals $T_{S2}$ and $T_{S3}$ also include some relatively fixed delays introduced by equipment which is not a part of the loop $L_1$.

Thus, the computing counter 530 may be programmed to subtract the total equipment introduced delay ($T_{S2}+T_{S3}$) from the total equipment and range introduced delay $T_{S1}$ to obtain an extremely accurate indication of the propagation time $T_{SP}$ of the wave energy through the atmosphere between the interrogator unit 14 and the responder unit 10. For even greater accuracy, the computing counter 530 may be programmed to compensate for those relatively fixed delays in the loops $L_2$ and $L_3$ which are not common to the loop $L_1$ and for the relatively fixed delays in the loop $L_1$ not common to the loops $L_2$ and $L_3$.

It should be noted that the loops $L_1$, $L_2$ and $L_3$ will oscillate at their natural frequencies as long as the loop gains are greater than one. The frequency bands, i.e., the ranges over which these frequencies may vary, can be approximated empirically or theoretically and the filters 632–636 designed to pass corresponding desired frequency bands. The reamining filters in the interrogator and responder units may be sized in the same manner.

ADVANTAGES AND SCOPE OF THE INVENTION

It is apparent from the foregoing that the present invention possesses numerous advantages over prior art systems.

A primary advantage is the great accuracy of the range measurements and position determinations obtainable utilizing the basic method and system of the invention in its improvement format.

For example, following the conventional prior art practice, alignment was being accomplished by following a string of buoys preplaced along the desired route by a survey vessel that was equipped with an electronic positioning system. The buoys were inaccurate as to known horizontal positions as a function of two variables: the positional accuracy of the system used to place the buoys, and the water conditions (depth, current speed and direction) in which the buoys were placed, which affected the length of buoy pennant lines. These inaccuracies relating to known errors in horizontal position of any one buoy at any given time were on the order of magnitude of 50 to 200 feet. Additionally, the operators aboard the pipelaying barge visually sighted along the string of buoys from a tower on the barge, causing errors that varied person to person as a result of individual interpretation, poor visibility, etc.

However, the techniques described in the above captioned application, entailing the use of a preplotted course visually displayed to the operators onboard the pieplaying barge in conjunction with the plotting of actual vessel position during pipelaying as referenced to this course, in practice have been found to produce greatly improved positional determination accuracy on the order of magnitude of 6 feet.

The system is particularly adaptable to offshore use where vessel movement is encountered in that the signals need not be highly directional as in some prior art systems. Moreover, the accuracy of the position determinations and the speed at which these determinations are obtained may be particularly advantageous in offshore operations both for immediate and future use.

The use of the system in underwater pipelaying operations is very advantageous in that highly accurate pipeline positions result and highly accurate records of pipeline positions can be produced. Thus, pipelines may be deposited along extremely narrow rights of way and may be rapidly located should the need arise at a future date.

Observed results of the implementation of the system herein described include (a) improved ability to return to a given location and locate a submerged pipeline valve, damaged area, etc.; (b) reduction in the "meandering" of a pipeline, with resultant savings in pipe quantities used between termini; (c) increase in pipe lay progress because of the improved information available to the anchor winch operators and their confidence in the information; and (d) better correlation between different construction barges working on the same pipeline with both using the described survey equipment, e.g., ability of a pipe lay barge to place pipe in a ditch previously dredged by a different barge.

The present invention may thus be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes, additions, deletions, substitutions, or modifications which come within the meaning and range of equivalency of the claims are therefore intended to be embraced therein.

What is claimed is:

1. A method of laying a pipeline offshore, said method comprising:
   providing pipeline working vessel means operable to lay a pipeline at an offshore location;
   supporting a pipeline from said piepline working vessel means with a portion thereof extending between said vessel means and a submerged location;
   generating electrical signals representative of the ranges from said pipeline working vessel means to each of a plurality of transponders, each located at a predetermined geographical position;
   providing position plotting means carried by said pipeline working vessel means and containing a preplotted course related to a predetermined position of said pipeline;
   determining, on said pipeline working vessel means, an actual offshore position of said pipeline working vessel means during the laying of said pipeline;
   said determining of an actual offshore position of said pipeline working vessel means being effected by
      providing means on said pipeline working vessel means for storing data,
      modifying said generated electrical signals on said pipeline working vessel means responsively to said stored data to correct for inaccuracy related to atmospheric conditions,
      further modifying said generated electrical signals on said pipeline working vessel means responsively to said stored data to provide electrical signals representative of the ranges, in a predetermined reference plane, from the vessel means to each of said plurality of said transponders, and
      on said pipeline working vessel means, determining the navigational coordinates of an actual position of said pipeline working vessel means responsively to said further modified generated electrical signals;
   visually indicating on said plotting means an indication of said predetermined position of said pipeline relative to an actual position of said pipeline working vessel means as determined by said navigational coordinates;
   laying said pipeline from said pipeline working vessel means, with said pipeline working vessel means floating on a body of water and with at least a portion of said pipeline being disposed on said submerged location;
   while laying said pipeline from said pipeline working vessel means, operating said pipeline working vessel means in accordance with said visual indication of said predetermined position of said pipeline relative to said actual portion of said pipeline working vessel means so as to cause the location of said pipeline, as laid, to tend to bear a desired coincidence with said predetermined pipeline position.

2. A method of working with a pipeline offshore, said method comprising:
   providing pipeline working vessel means operable to work with an at least partially submerged pipeline at an offshore location;
   providing a pipeline disposed at least in part at a submerged location;
   generating electrical signals representative of the ranges from said pipeline working vessel means to each of a plurality of predetermined geographical positions;
   providing position plotting means carried by said pipeline working vessel means and containing a preplotted course related to a predetermined position of said pipeline;
   determining, on said pipeline working vessel means, and in response to said signals, an actual offshore position of said pipeline working vessel means during the performing of work relating to said pipeline;
   visually indicating on said plotting means an indication of said predetermined position of said pipeline relative to said actual offshore position of said pipeline working vessel means;
   performing work on said pipeline from said pipeline working vessel means, with said pipeline working vessel means floating on a body of water and with at least a portion of said pipeline being disposed on said submerged location; and while performing work on said pipeline from said pipeline working vessel means, operating said pipeline working vessel means in accordance with said visual indication of said predetermined position of said pipeline relative to said actual position of said pipeline working vessel means so as to cause the actual location of said pipeline working vessel means to tend to bear a desired coincidence with said predetermined pipeline position.

3. A method as described in claim 2 wherein said preplotted course is provided by:
   providing movable chart means in said plotter means, with said chart means having
      a desired course preplotted thereon in the form of a plurality of substantially contiguous line segments of a desired offshore course of vessel means, said course line segments being disposed in sequence along a portion of said chart means, and
      a plurality of segments of grid lines separately oriented relative to at least some of said course line segments.
   at least one of said grid line segments being associated with at least one of said desired course line segments and being oriented in an orientation relative to said chart means different from that of another adjacent one of said grid line segments, with said different orientations of said one and other grid line segments being operable to reduce with width of said portion of said chart means having preplotted thereon said one course line segment and another course line segment associated with said other grid line segment;
   effecting said different orientations by orienting grid line segments associated with at least two adjacent course line segments in relative inclination, with the grid line pattern of one grid line segment associated with one of said at least two adjacent course line segments being inclined relative to the grid line pattern of another grid line segment associated with another of said at least two adjacent course line segments and being displaced from alignment with a projection of the grid line pattern of said other grid line segment;

said relative inclination between said two adjacent grid line segments resulting from different orientations of said one and said other grid line segments produced by rotation of one of said one and other grid line segments relative to a projection of the other of said one and other grid line segments; and arranging the course line segments of said at least two adjacent course line segments in generally end-to-end relation, extending between lateral boundaries separated by a distance less than a distance between lateral boundaries of said at least two course line segments which would result if said at least two course line segments were plotted on a grid pattern comprising said one grid line segment and a projection thereof; with said lesser distance between said lateral boundaries being a consequence of said relative inclination of grid line segments associated with said at least two course line segments; and said preplotted desired course, including said at least two course line segments, more closely approaching a generally straight line configuration than would result from the plotting of said at least two course line segments on a grid line pattern corresponding to that of said one grid line segment and a projection thereof.

4. Apparatus for laying a pipeline offshore, said apparatus comprising:

pipeline working vessel means operable to lay a pipeline at an offshore location;

a pipeline;

support means on said working vessel means supporting said pipeline with a portion thereof extending between said working vessel means and a submerged location;

a plurality of remote transponders each having a known geographical location and adapted to transmit radio signals at predetermined microwave frequencies when triggered;

position plotting means carried by said pipeline working vessel means and containing a preplotted course related to a predetermined position of said pipeline;

pipeline working position determining means located on said pipeline working vessel means, and operable to determine an actual offshore position of said pipeline working vessel means during the laying of said pipeline;

said pipeline working position determining means including transmitter means for triggering each of said remote transponders at predetermined time intervals, receiver means for receiving the signals transmitted by said transponders, computer means including first means responsive to said transmitter means and receiver means for computing the ranges from the barge to each of said transponders, means for storing data, said computer means including second means responsive to said data storing means and said first means to said computer means for computing the coordinates of an actual position of said barge in a predetermined navigational coordinate system, said second means of said computer means including atmosphere correction means responsive to said first means of said computer means and said data storing means for correcting the ranges to each of said transponders for inaccuracy related to the refractivity of the atmosphere, and reference plane correction means responsive to said atmosphere correction means and said data storing means for correcting the ranges to each of said transponders to a predetermined reference plane;

visual indicating means included in said plotting means and operable to visually indicate said predetermined position of said pipeline relative to an actual position of said pipeline working vessel means as determined by said pipeline working position determining means;

pipeline laying means comprising said pipeline working vessel means and said support means, with said pipeline working vessel means floating on a body of water and with at least a portion of said pipeline being disposed on said submerged location; and means operable, while laying said pipeline with said pipeline working means, to operate said pipeline working vessel means in accordance with said visual indication of said predetermined position of said pipeline relative to said actual position of said pipeline working vessel means so as to cause the location of said pipeline, as laid, to tend to bear a desired coincidence with said predetermined pipeline position.

5. Apparatus for working with a pipeline offshore, said apparatus comprising:

pipeline working vessel means operable to work with an at least partially submerged pipeline at an offshore location;

a pipeline disposed at least in part at a submerged location;

plurality of means at predetermined geographical locations adapted to transmit electrical signals;

position plotting means carried by said pipeline working vessel means and containing a preplotted course related to a predetermined position of said pipeline;

pipeline working position determining means located on said pipeline working vessel means, and operable in response to said signals to determine an actual offshore position of said pipeline working vessel means during the performing of work relating to said pipeline;

visual indicating means included in said plotting means and operable to visually indicate said predetermined position of said pipeline relative to an actual position of said pipeline working vessel means;

pipeline working means comprising said pipeline working vessel means for performing work on said pipeline, with said pipeline working vessel means floating on a body of water; and means operable, while performing work on said pipeline with said pipeline working means, to operate said pipeline working vessel means in accordance with said visual indication of said predetermined position of said pipeline relative to said actual position of said pipeline working vessel means so as to cause the actual location of said pipeline working vessel means to tend to bear a desired coincidence with said predetermined pipeline position.

6. Apparatus as described in claim 5 wherein said preplotted course comprises:

movable chart means included in said plotter means and having a desired course preplotted thereon in the form of a plurality of substantially contiguous line segments of a desired offshore course of vessel means, said course line segments being disposed in sequence along a portion of said chart means, and a plurality of segments of grid lines separately oriented relative to at least some of said course line segments, at least one of said grid line segments being associated with at least one of said desired course line segments and being oriented in an orientation relative to said chart means different from that of another adjacent one of said grid line segments, with said different orientations of said one and other grid line segments being operable to reduce the width of said portion of said chart means having preplotted thereon said one course line segment and another course line segment associated with said other grid line segment;

said two adjacent grid line segments being associated with at least two adjacent course line segments and being mutually inclined, with the grid line pattern of one grid line segment associated with one of said at least two adjacent course line segments being inclined relative to the grid line pattern of another grid line segment associated with another of said at least two adjacent course line segments and being displaced from alignment with a projection of the grid line pattern of said other grid line segment;

said relative inclination between said two adjacent grid line segments resulting from different orientations of said one and said other grid line segments produced by rotation of one of said one and other grid line segments relative to a projection of the other of said one and other grid line segments;

the course line segments of said at least two adjacent course line segments being arranged in generally end-to-end relation and extending between lateral boundaries separated by a distance less than a distance between lateral boundaries of said at least two course line segments which would result if said at least two course line segments were plotted on a grid pattern comprising said one grid line segment and a projection thereof;

said lesser distance between said lateral boundaries being a consequence of said relative inclination of grid line segments associated with said at least two course line segments; and said preplotted desired course, including said at least two course line segments, more closely approaching a generally straight line configuration than would result from the plotting of said at least two course line segments on a grid line pattern corresponding to that of said grid line segment and a projection thereof.

\* \* \* \* \*